US012589329B2

(12) United States Patent
Buckenmaier et al.

(10) Patent No.: US 12,589,329 B2
(45) Date of Patent: Mar. 31, 2026

(54) FLUID SEPARATION WITH SAMPLING UNIT SELECTIVELY COUPLING UPSTREAM AND DOWNSTREAM OF SEPARATION UNIT

(71) Applicant: Agilent Technologies, Inc., Santa Clara, CA (US)

(72) Inventors: Stephan Buckenmaier, Ettlingen (DE); Sascha Lege, Baden-Wuerttemberg (DE); Thomas Ortmann, Straubenhardt/Ottenhausen (DE); Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 624 days.

(21) Appl. No.: 17/787,107

(22) PCT Filed: Dec. 1, 2020

(86) PCT No.: PCT/IB2020/061308

§ 371 (c)(1),
(2) Date: Jun. 17, 2022

(87) PCT Pub. No.: WO2021/123983

PCT Pub. Date: Jun. 24, 2021

(65) Prior Publication Data

US 2023/0039500 A1 Feb. 9, 2023

(30) Foreign Application Priority Data

Dec. 17, 2019 (GB) ...................................... 1918594

(51) Int. Cl.
*B01D 15/18* (2006.01)
*G01N 30/46* (2006.01)

(52) U.S. Cl.
CPC ....... *B01D 15/1878* (2013.01); *G01N 30/463* (2013.01)

(58) Field of Classification Search
CPC .... B01D 15/1878; B01D 15/08; B01D 15/10; B01D 15/18; B01D 15/24; G01N 30/463
(Continued)

(56) References Cited

U.S. PATENT DOCUMENTS 3,975,946 A * 8/1976 Ball ........................ G01N 30/20
137/625.15
2009/0255601 A1 10/2009 Baeuerle et al.
(Continued)

FOREIGN PATENT DOCUMENTS

CN 103930778 A 7/2014
CN 104285145 A 1/2015
(Continued)

OTHER PUBLICATIONS

PCT Notification of Transmittal of The International Search Report & Written Opinion issued on Mar. 5, 2021 for Application No. PCT/IB2020/061308; 13 pages.
(Continued)

*Primary Examiner* — Madeline Gonzalez

(57) ABSTRACT

A fluid processing apparatus includes a first fluid separation apparatus including a first fluid pump, configured for driving a first mobile phase, and a first separation unit configured for separating a fluidic sample when within the first mobile phase. A sampling unit includes a modulation buffering unit and a modulation drive, wherein the modulation drive is configured for introducing fluid into the modulation buffering unit. A switching unit is configured, in a first switching state, for introducing fluid into the modulation buffering unit from downstream of the first separation unit, and, in a second switching state, for introducing fluid buffered in the
(Continued)

modulation buffering unit in a first flow path between the first fluid pump and the first separation unit.

19 Claims, 13 Drawing Sheets

(58) Field of Classification Search
USPC ...................................... 210/656, 659, 198.2
See application file for complete search history.

(56) References Cited

U.S. PATENT DOCUMENTS

| | | | |
|---|---|---|---|
| 2012/0240666 | A1 | 9/2012 | Sims |
| 2016/0334031 | A1 | 11/2016 | Shoykhet et al. |
| 2017/0343520 | A1 | 11/2017 | Ortmann et al. |

FOREIGN PATENT DOCUMENTS

| | | | |
|---|---|---|---|
| CN | 104395748 | A | 3/2015 |
| CN | 106471368 | A | 3/2017 |
| CN | 107449851 | A | 12/2017 |
| CN | 108490107 | A | 9/2018 |
| CN | 109932464 | A | 6/2019 |
| DE | 102018114150 | A1 | 8/2018 |
| EP | 1666878 | A1 | 6/2006 |
| EP | 3252463 | A1 | 12/2017 |
| JP | H03135759 | A | 6/1991 |
| JP | 2002267643 | A | 9/2002 |
| WO | 2009062538 | A1 | 5/2009 |
| WO | 2009084235 | A1 | 7/2009 |
| WO | 2011147801 | A1 | 12/2011 |
| WO | 2016016740 | A1 | 2/2016 |

OTHER PUBLICATIONS

Intellectual Property Office Search Report under Section 17 issued on Jun. 1, 2020 for Application No. GB1918594.1; 4 pages.
Chinese office action and search report dated Aug. 24, 2023 for application No. 202080087290.1; 11 pages.

* cited by examiner

FLUID SEPARATION WITH SAMPLING UNIT SELECTIVELY COUPLING UPSTREAM AND DOWNSTREAM OF SEPARATION UNIT

RELATED APPLICATIONS

This application is the national stage under 35 U.S.C. 371 of International Application No. PCT/IB2020/061308, filed Dec. 1, 2020, which claims priority to UK Patent Application No. GB 1918594.1, filed Dec. 17, 2019; the entire contents of each of which are incorporated by reference herein.

TECHNICAL FIELD

The present invention relates to fluid separation in particular for liquid chromatographic sample separation.

BACKGROUND

In liquid chromatography, a fluidic sample and an eluent (liquid mobile phase) may be pumped through conduits and a column in which separation of sample components takes place. The column may comprise a material which is capable of separating different components of the fluidic analyte. Such a packing material, so-called beads which may comprise silica gel, may be filled into a column tube which may be connected to other system elements (like a sampler, a detector) by conduits.

The composition of the mobile phase can be adjusted by composing the mobile phase from different fluidic components with variable contributions, so called gradient mode. High performance liquid chromatography ("HPLC") systems often are operated in such gradient mode, wherein for instance for reversed phase chromatography the organic content is ramped over time, or for ion exchange chromatography the salt content is ramped over time. Especially in peptide or protein analysis most applications are based on water/acetonitrile gradients. An analytical protocol for running a defined analytical process is called the "method". In the analytical protocol—or method—for a gradient separation, the gradient is usually defined as a composition change program over time, while the flow rate may be kept constant. The so-called retention time is a time required for transport of a certain component of a fluidic sample to be separated throughout a separation column during a separation run.

Two-dimensional separation of a fluidic sample denotes a separation technique in which a first separation procedure (typically in a first separation unit such as a first chromatographic column) is performed to separate a fluidic sample into a plurality of fractions, and in which a subsequent second separation procedure (typically in a second separation unit such as a second chromatographic column) is performed to further separate at least one of the plurality of fractions into sub-fractions. Two-dimensional liquid chromatography (2D LC) may combine two liquid chromatography separation techniques and plot the time dependency of detection events along two orthogonal time axes.

US20160334031A1, by the same applicant, discloses a so-called "flow-through injection" in a two-dimensional chromatography application allowing to transfer sample fluid by selectively switching a sample loop from within the flow path of one dimension into the flow path of the other dimension.

US2017343520A1, by the same applicant, discloses—inter alia—a two-dimensional separation apparatus having a flow adjustment unit. The flow adjustment unit allows to provide a point coupling with the first-dimension and to draw fluid (e.g. separated fractions) from the first-dimension into the flow adjustment unit, and to provide a further point coupling with the second-dimension allowing a so-called "feed injection" by injecting fluid buffered in the flow adjustment unit into the second-dimension.

SUMMARY

It is an object of the invention to provide an improved fluid separation, preferably for multi-dimensional chromatographic sample separation.

Active solvent modulation using dedicated valve technology is a valuable technology to overcome solvent incompatibility issues in 2D-LC (two-dimensional liquid chromatography). As the dilution is determined here by differences in the restriction of two flow paths generated by dedicated restriction capillaries, this approach suffers generally from a low flexibility, a low dynamic range for sample dilution and a dilution ratio that is solvent dependent. The application of the feed-injection principle overcomes these obstacles, as the sample can be actively fed with a pumping device in a controlled manner.

Still in any 2D-LC system it is necessary to introduce a sample into the first-dimension separation system and then to transfer one or multiple fraction(s) of the effluent of the first dimension into the second dimension. In many implementations it is advantageous to implement a metering functionality in the aliquoting or aliquot transfer from the first to the second dimension. These include:

Push-pull aliquoting optionally including usage of a buffer loop,

Feed injection in the second dimension with passive filling of the aliquot loop, Active metering of the aliquot with loop injection into the second LC-dimension.

Some embodiments of the present invention propose using a single metering appliance to serve both sample injection into the first dimension and aliquot transfer from the first into the second dimension. This will reduce the total cost of the apparatus by elimination of redundancy and reduction of total parts count and enhance reliability and robustness due to reduction of total parts count.

Once the sample has been injected into the first-dimension LC separation, a metering device is no longer needed in the first-dimension separation system throughout the analysis. Embodiments of the present invention allow to use the same metering device not only for the injection into the first dimension but also for the sampling of 1D (first dimension) effluent and the re-injection of collected fractions for a second-dimension chromatography. Switching the metering device between the 1D and 2D (second dimension) flow-paths for sampling and injection can be realized with dedicated valve designs, either embodied as separate valves or as additional (special) positions of the modulation valve or modulation device. It is also possible to switch between usage of the metering device in the first and second dimension by using two needle seats (one in the first, the other in the second dimension correspondingly) and one needle-loop-metering device serving both seats.

It is understood, that the term "Metering device" corresponds to a device capable of metering fluid for intake and delivery and, depending on the specific implementation, having also additional features as known in the art:

can draw/feed under high pressure;

can eject more fluid, than it has drawn (using additional fluid sources);

can include an attached buffer loop or not;

can be situated anywhere in the LC or 2D-LC system, e.g. be a constituent part of autosampler, be dedicated metering unit for second dimension, be a universal metering device.

In particular, the following configurations can be readily implemented both in a conventional 2D-LC apparatus and in a single stack 2D-LC, implementations (in a conventional 2D-LC) resp operation modes (in a single stack 2D-LC) of first and second dimension freely permutable:

First-Dimension Mode:

conventional loop injector with loop-external metering device;

conventional loop injector with in-loop metering device in ADVR mode (metering device and optionally loop are excluded from first-D main path after injection);

feed injector.

Second-Dimension Mode:

push-pull injector, optionally with a mask flow appliance and buffer loop passive loop filling and feed injection pull loop filling and conventional loop injection.

It is also possible to use the single metering device in a "Single Stack" type of configuration. In this case the following operation modes for the first and second dimension can be permutated:

First Dimension:

In scope of the proposed approach a flexible solution that can be implemented, which also support further applications beyond standard 2D-LC separations:

Fraction collection into sampling vials after chromatographic separation—7 makes dedicated fraction collector unnecessary The collected fraction can be modified prior to injection, e.g. by adding internal standards from a sample vial.

If trapping cartridges are used instead of capillaries for sampling of 1D effluent, the metering device could be also used to treat the trapped analytes prior to injection for 2D separation. One possibility would be desalting, but reaction solutions could be also added that could modify the analyte's nature.

In an embodiment, a fluid processing apparatus comprises a first fluid separation apparatus comprising a first fluid pump, a first separation unit, a sampling unit, and a switching unit. The first fluid pump is configured for driving a first mobile phase. The first separation unit (preferably a chromatographic column) is configured for separating a fluidic sample when comprised within the first mobile phase. The sampling unit comprises a modulation buffering unit and a modulation drive, wherein the modulation drive is configured for introducing fluid into the modulation buffering unit. The switching unit is configured, in a first switching state (also referred to as "1D-outlet"), for introducing (also referred to as drawing) fluid into the modulation buffering unit from downstream of the first separation unit. In a second switching state (also referred to as "1D-Injection"), the switching unit is configured for introducing (also referred to as ejecting) fluid buffered in the modulation buffering unit in a first flow path between the first fluid pump and the first separation unit. The switching unit in combination with the sampling unit thus allows aliquoting fluid downstream from the first separation unit as well as ejecting fluid-upstream to the first separation unit-into the first mobile phase for becoming separated by the first separation unit.

In an embodiment, the apparatus comprises a first coupling point fluidically coupled downstream of the first separation unit, wherein in the first switching state of the switching unit, the sampling unit is configured for introducing (e.g. branching a part of) fluid from the first coupling point into the modulation buffering unit. This allows aliquoting fluid via a point coupling at the first coupling point by drawing fluid from the first coupling point into the modulation buffering unit.

In an embodiment, in the first switching state of the switching unit, the modulation buffering unit is coupled downstream of the first separation unit and receiving a fluid content therefrom. This allows aliquoting fluid via flowing through the modulation buffering unit.

In an embodiment, the apparatus comprises a second coupling point in the flow path between the first fluid pump and the first separation unit, wherein in the second switching state of the switching unit, the sampling unit is configured for introducing a fluid content buffered in the modulation buffering unit into the flow path between the first fluid pump and the first separation unit by combining a flow from the first fluid pump with a flow from the modulation buffering unit. This allows ejecting fluid into the mobile phase via the second coupling point in the sense of the afore-described "feed-injection" by combining the sampling flow with the flow of the first mobile phase.

In an embodiment, in the second switching state of the switching unit, the modulation buffering unit is coupled in the flow path between the first fluid pump and the first separation unit. This allows injecting sample fluid into the mobile phase in the sense of the afore-described "flow-through injection" by switching the modulation buffering unit into the flow path of the mobile phase upstream to the first separation unit.

In an embodiment, the switching unit is configured, in a third switching state, to enable pressurising or depressurising a fluid content within the modulation buffering unit by acting of the modulation drive. This can be provided in that the switching unit fluidically blocks one end of the modulation buffering unit while the modulation drive is coupled to and acting on an opposite end of the modulation buffering unit. Alternatively, this can be provided in that the buffering unit and the modulation drive are fluidically connected to each other and fluidically disconnected from other fluidic connections, inlets and outlets in the corresponding switching state of the switching unit. The third switching state might refer to a specific angle position of the switching unit or to an angle range, e.g. such that a rotary valve does not stop its motion during the pressurization or depressurising. An embodiment comprises plural such third switching states e.g. for pressurising or depressurising between different switching states.

In an embodiment, the apparatus comprises a second fluid separation apparatus comprising a second fluid pump, configured for driving a second mobile phase, and a second separation unit (preferably a second chromatographic column) configured for separating a fluidic sample when comprised within the second mobile phase. This allows providing a multidimensional fluid separation, such as a two-dimensional fluid separation, with each dimension of fluid separation preferably providing a fluid separation mechanism being at least substantially orthogonal to the other fluid separation mechanism(s).

In an embodiment, the switching unit is configured, in a fourth switching state (or further switching state), for introducing fluid buffered in the modulation buffering unit in (or into) a flow path between the second fluid pump and the second separation unit. This allows ejecting fluid buffered in the modulation buffering unit into the second fluid separation apparatus, preferably a sample fluid for being separated by the second separation unit.

In an embodiment, the apparatus comprising the second fluid separation apparatus comprises a third coupling point in the flow path between the second fluid pump and the second separation unit, wherein in the fourth switching state (or further switching state) of the switching unit, the sampling unit is configured for introducing a fluid content buffered in the modulation buffering unit into the flow path between the second fluid pump and the second separation unit by combining a flow from the second fluid pump with a flow from the modulation buffering unit. This allows ejecting fluid into the second mobile phase via the third coupling point in the sense of the afore-described "feed-injection" by combining the sampling flow with the flow of the second mobile phase.

In an embodiment of the apparatus comprising the second fluid separation apparatus, in the fourth switching state (or further switching state) of the switching unit the modulation buffering unit is coupled in (or into) the flow path between the second fluid pump and the second separation unit. This allows injecting sample fluid into the second mobile phase in the sense of the afore-described "flow-through injection" by switching the modulation buffering unit into the flow path of the second mobile phase upstream to the second separation unit.

In an embodiment of the apparatus comprising the second fluid separation apparatus, the switching unit is configured, in a fifth switching state (or additional switching state) (also referred to as "2D-outlet"), for introducing fluid into the modulation buffering unit from downstream of the second separation unit. This allows aliquoting fluid downstream from the second separation unit into the modulation buffering unit.

In an embodiment, the apparatus comprises a fourth coupling point fluidically coupled downstream of the second separation unit, wherein in the fifth switching state (or additional switching state) of the switching unit, the sampling unit is configured for introducing fluid from the fourth coupling point into the modulation buffering unit. This allows aliquoting fluid via a point coupling at the fourth coupling point by drawing fluid from the fourth coupling point into the modulation buffering unit.

In an embodiment, in the fifth switching state (or additional switching state) of the switching unit, the modulation buffering unit is coupled downstream of the second separation unit and receiving a fluid content therefrom. This allows aliquoting fluid via flowing through the modulation buffering unit.

In an embodiment, the first fluid processing unit and the second fluid processing unit are fluidically decoupled from each other, so that a transfer of fluid from the first fluid processing unit to the second fluid processing unit can occur only via active modulation by the switching unit and the sampling unit. This allows controlling flow and avoiding any passive fluid transfer between the first and second fluid processing units.

In an embodiment, the first fluid processing unit comprises a first flow path, and the second fluid processing unit comprises a second flow path, wherein the first flow path and the second flow path are fluidically decoupled from each other, preferably so that there is no passive flow connection between the first flow path and the second flow path at any time, and a transfer of fluid from the first flow path to the second flow path can occur only via active modulation by the modulation unit. This allows controlling flow and avoiding any passive fluid transfer between the first and second fluid processing units.

In an embodiment, the modulation buffering unit comprises at least one of a group of: a sample loop, a sample volume, a trap volume, a trap column, a fluid reservoir, a capillary, a tube, a microfluidic channel structure. This allows the modulation buffering units to buffer fluid as required by the respective application.

In an embodiment, the fluid introduced into the modulation buffering unit during the first switching state is different from the buffered fluid introduced in the first flow path between the first fluid pump and the first separation unit during the second switching state. This allows separating fluid aliquoting and fluid ejection by allowing to introduce a different fluid for being separated by the first separation unit than what fluid has been aliquoted previously from downstream of the first separation unit. However, it is clear that also fluid aliquoted from downstream of the first separation unit may later be ejected upstream to the first separation unit for further separation.

In an embodiment, a fluid separation apparatus is configured for multi-dimensional chromatographic separations. The apparatus comprises a fluid pump, configured for driving a mobile phase, a separation unit configured for separating a fluidic sample when comprised within the mobile phase, and a sampling unit. The sampling unit comprises a modulation buffering unit and a modulation drive. The modulation drive is configured for at least one of: drawing fluid into the modulation buffering unit, and ejecting fluid buffered in the modulation buffering unit into a chromatographic flow path between the fluid pump and the separation unit. The modulation drive operates at least one of: drawing a fluid into the modulation buffering unit, wherein the fluid is predestinated for injection into the chromatographic flow path between the fluid pump and the separation unit, and ejecting the drawn fluid into the chromatographic flow path between the fluid pump and the separation unit. The modulation drive further operates at least one of: drawing an aliquot of an effluent of the separation unit into the modulation buffering unit, and ejecting the drawn effluent buffered in the modulation buffering unit for further separation, preferably into a further chromatographic flow path between a further fluid pump and a further separation unit. This allows aliquoting fluid downstream from the separation unit as well as ejecting fluid for further becoming separated.

Another embodiment relates to a method for processing fluid in a fluid separation path wherein a mobile phase is driven through a separation unit for separating a fluidic sample when comprised within the first mobile phase. The method comprises, in a first state, introducing (e.g. drawing) fluid into a modulation buffering unit from downstream of the separation unit, and in a second state, introducing (e.g. ejecting) fluid buffered in the modulation buffering unit into the mobile phase for being separated by first separation unit. This allows aliquoting fluid downstream from the first separation unit as well as ejecting fluid—upstream to the first separation unit-into the first mobile phase for becoming separated by the first separation unit.

In an embodiment, at least one of the coupling points is configured as one of the group consisting of: a fluidic T-piece, a fluidic Y-piece, a fluidic X-piece, microfluidic junction, a group of at least 3 ports of a rotary valve, connectable together in at least one of positions of the said rotary valve and a multi-entry port of a rotary valve.

Each coupling point can be incorporated or located within or as part of the switching unit (preferably implemented as a port or groove or any other part thereof) or may be fluidically coupled by any kind of fluidic conduit (e.g. a tubing or capillary, preferably as a Tee or alike junction) to a respective port thereof. In the latter case, care should be taken to avoid any sample cross contamination or other artefacts as resulting from any fluid remaining in such conduit between the respective port of the switching unit and the respective coupling point, e.g. by adequately cleaning/flushing such conduit.

In an embodiment, at least one of the coupling points comprises at least two channels joining in a rotary valve such that their joining point constitutes a port on either rotor or stator of the rotary valve, and interfacing a third channel implemented as a part of or is built in the respectively other part of the rotary valve (either stator or rotor).

In an embodiment, the apparatus is a fluid separation apparatus configured for separating a fluidic sample.

In an embodiment, the first fluid separation apparatus is configured for (preferably chromatographically) separating a fluidic sample in a first dimension, wherein the first fluid separation apparatus preferably comprises a first fluid drive (e.g. a pump) configured for driving a first mobile phase, and a first chromatographic column configured for separating the fluidic sample when comprised within the first mobile phase. Other components typically used in liquid chromatography, such as a first sample introduction unit (e.g. an autosampler) for injecting the sample fluid into the mobile phase and/or a detector for detecting separated compounds of the sample fluid, may also be used.

The first fluid separation apparatus may also be embodied as a chemical and/or biological reactor or a part thereof. Preferably, the first fluid separation apparatus may be a flow line from such chemical and/or biological reactor, e.g. for monitoring such reactor. The flow line may be branched off from such reactor or a closed loop from and to such reactor.

In an embodiment, the second fluid separation apparatus is configured for (preferably chromatographically) separating a fluid sample in a second dimension, wherein the fluidic sample preferably is transferred (received) from the first fluid separation apparatus. The second fluid separation apparatus preferably comprises a second fluid drive (e.g. a pump) configured for driving a second mobile phase, and a second chromatographic column configured for separating the fluidic sample when comprised within the second mobile phase. Other components typically used in liquid chromatography, such as a detector for detecting separated compounds of the sample fluid, may also be used.

With the first and second fluid separation apparatuses each being configured as a respective chromatographic fluid separation apparatus, a two-dimensional fluid separation can be provided with a fluid transfer from the first into the second fluid separation dimension.

In an embodiment, the modulation buffering unit is configured for temporarily storing an amount of fluid, which may later be fully or partly retrieved thereof. The modulation buffering unit may comprise at least one of a group of: one or more sample loops, one or more sample volumes, one or more trap volumes, one or more trap columns, one or more fluid reservoirs, one or more capillaries, one or more tubes (preferably bend/coiled/knitted capillaries or tubes), one or more microfluidic channel structures (preferably 2-dimensional or 3-dimensional, preferably embodied in a planar configuration as described e.g. in US20090255601A1 by the same applicant), one or more reactor volumes allowing to execute a chemical and/or biological reaction with the fluid volume buffered therein, a so-called "Parkdeck" configuration with a plurality of selectable buffering volumes as disclosed e.g. in WO2016016740A1 by the same applicant, or the like. The modulation buffering unit can be configured/optimized for low flow resistance and low dispersion. The modulation buffering unit can be configured/optimized for having low longitudinal mixing characteristic, so that mixing of any variation (e.g. in concentration, composition, et cetera) in the buffered fluid content along the fluid motion direction or axis substantially only occurs under the influence of diffusion. The modulation buffering unit can be configured/optimized to at least substantially maintain a spatial variation in the sample fluid (along the flow direction of the sample), as e.g. resulting from a previous chromatographic separation of the sample fluid, during temporarily storing of such sample fluid.

The term "aliquot" or "sample aliquot" as used herein can be understood as a portion of a fluid (e.g. a fluidic sample), preferably a portion of an effluent of a first dimension, which is (or will be) subjected as a whole (i.e. preferably comprising its entire volume) to separation (typically in a second dimension) into one or more fractions thereof.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "fraction" may particularly denote such a group of molecules or particles of a fluidic sample which have a certain property (such as mass, charge, volume, chemical properties or interaction, etc.) in common according to which the separation has been carried out. However, molecules or particles relating to one fraction can still have some degree of heterogeneity, i.e. can be further separated in accordance with another separation criterion. As well, the term "fraction" may denote a portion of a solvent containing the afore-mentioned group of molecules.

In the context of this application, the term "sub-fractions" may particularly denote individual groups of molecules or particles all relating to a certain fraction which still differ from one another regarding a certain property (such as mass, volume, chemical properties, etc.). Hence, applying another separation criterion for the second separation as compared to the separation criterion for the first separation allows these groups to be further separated from one another by applying the other separation criterion, thereby obtaining the further separated sub-fractions. As well, the term "sub-fraction" may denote a portion of a solvent containing the afore-mentioned individual group of molecules.

In the context of this application, the term "downstream" may particularly denote that a fluidic member located downstream compared to another fluidic member will only be brought in interaction with a fluidic sample after interaction with the other fluidic member (hence being arranged upstream). Therefore, the terms "downstream" and "upstream" relate to a flowing direction of the fluidic sample. The terms "downstream" and "upstream" may also relate to a preferred direction of the fluid flow between the two members being in downstream-upstream relation.

In the context of this application, the term "fluid separation apparatus" may particularly denote any apparatus which is capable of separating different fractions of a fluidic sample by applying a certain separation technique. Particularly, two separation apparatus may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion ore more finely separated in accordance with the first separation criterion.

The term "separation unit" may particularly denote a fluidic member through which a fluidic sample is transferred, and which is configured so that, upon conducting the fluidic sample through the separation unit, the fluidic sample will be separated into different groups of molecules or particles (called fractions or sub-fractions, respectively). An example for a separation unit is a liquid chromatography column which is capable of trapping or retarding and selectively releasing different fractions of the fluidic sample.

In the context of this application, the term "fluid drive" may particularly denote any kind of pump which is configured for forcing a flow of mobile phase and/or of a fluidic sample along a fluidic path. A corresponding liquid supply system may be configured for delivery of a single liquid or of two or more liquids in controlled proportions and for supplying a resultant mixture as a mobile phase. It is possible to provide a plurality of solvent supply lines, each fluidically connected with a respective reservoir containing a respective liquid, a proportioning valve interposed between the solvent supply lines and the inlet of the fluid drive, the proportioning valve configured for modulating solvent composition by sequentially coupling selected ones of the solvent supply lines with the inlet of the fluid drive, wherein the fluid drive is configured for taking in liquids from the selected solvent supply lines and for supplying a mixture of the liquids at its outlet. More particularly, the first fluid drive can be configured to drive the fluidic sample, usually mixed with, or injected into a flow of a mobile phase (solvent composition), through the first-dimension separation apparatus, whereas the second fluid drive can be configured for driving the fluidic sample fractions, usually mixed with a further mobile phase (solvent composition), after treatment by the first-dimension separation unit through the second-dimension separation apparatus.

In the context of this application, the term "flow coupler" or "coupling point" may particularly denote a fluidic component which is capable of unifying flow components from two fluid inlet terminals into one common fluid outlet terminal. For example, a bifurcated flow path may be provided in which two streams of fluids flow towards a bifurcation point are unified to flow together through the fluid outlet terminal. At a bifurcation point where the fluid inlet terminals and the fluid outlet terminal are fluidically connected, fluid may flow from any source terminal to any destination terminal depending on actual pressure conditions. The flow coupler may act as a flow combiner for combining flow streams from the two fluid inlet terminals further flowing to the fluid outlet terminal. The flow coupler may provide for a permanent (or for a selective) fluid communication between the respective fluid terminals and connected conduits, thereby allowing for a pressure equilibration between these conduits. In certain embodiments, the flow coupler may also act as a flow splitter.

In the context of this application, the term "valve" or "fluidic valve" may particularly denote a fluidic component which has fluidic interfaces, wherein upon switching the fluidic valve selective ones of the fluidic interfaces may be selectively coupled to one another so as to allow fluid to flow along a corresponding fluidic path, or may be decoupled from one another, thereby disabling fluid communication.

In the context of this application, the term "buffer" or "buffering" may particularly be understood as temporarily storing. Accordingly, the term "buffering fluid" is preferably understood as temporarily storing an amount of fluid, which may later be fully or partly retrieved from such unit buffering the fluid.

In the context of this application, the term "loop" may particularly be understood as a fluid conduit allowing to temporarily store an amount of fluid, which may later be fully or partly retrieved from the loop. Preferably, such loop has an elongation along the flow direction of the fluid and a limited mixing characteristic (e.g. resulting from diffusion), so that a spatial variation in composition in the fluid will be at least substantially maintained along the elongation of the loop. Accordingly, the term "sample loop" may be understood as a loop configured to temporarily store an amount of sample fluid. Further accordingly, a sample loop is preferably configured to at least substantially maintain a spatial variation in the sample fluid (along the flow direction of the sample), as e.g. resulting from a previous chromatographic separation of the sample fluid, during temporarily storing of such sample fluid.

In the context of this application, the term "couple", "coupled", or "fluidically coupled" may particularly be understood as providing a fluidic connection at least during a desired time interval. Such fluidic connection may not be permanent but allows an essentially unconstrained flow of fluid in at least one direction (e.g. a passive transport of fluid between the components fluidically coupled to each other) at least during such desired time interval. Accordingly, fluidically coupling may involve active and/or passive components, such as one or more fluid conduits, switching elements (such as valves), active switching valves or elements thereof, check valves, et cetera.

In an embodiment, the first fluid separation apparatus is implemented as a first-dimension separation apparatus, and the second fluid separation apparatus is implemented as a second-dimension separation apparatus. The first-dimension separation apparatus and the second-dimension separation apparatus are preferably configured so as to execute the respective sample separation in accordance with different separation criteria, particularly in accordance with at least partially orthogonal separation criteria. In this context, the term "orthogonal" may particularly denote the low degree or even lack of correlation between the retention parameters in the first and the second dimension in general or at least for the expected sample components. Exemplary embodiments of the invention make benefit of this cognition and propose to adjust the parameters under a consideration of the fact that the separation criteria of the first and second fluid separation apparatuses (e.g. first-dimension and second-dimension separation units) are not necessarily completely independent from one another.

Each separation unit (of either the first dimension, the second dimension, or both) may be a chromatographic column for separating components of the fluidic sample. Therefore, exemplary embodiments may be particularly implemented in the context of a liquid chromatography apparatus.

The sample separation apparatus may be configured to drive the mobile phase through the system by means of a high pressure, particularly of at least 400 bar, more particularly of at least 1000 bar.

Embodiments of the invention can be partly or entirely embodied or supported by one or more suitable software programs or products (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control unit, e.g. a data processing system such as a computer, preferably for executing any of the methods described herein. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs. The illustration in the drawings is schematic.

Referring now in greater detail to the drawings, FIG. 1 depicts a general schematic of a liquid separation system 10. A pump 20 receives a mobile phase from a solvent supply 25, typically via a degasser 27, which degases the mobile phase and thus reduces the amount of dissolved gases in it. The pump 20—as a mobile phase drive—drives the mobile phase through a separating device 30 (such as a chromatographic column) comprising a stationary phase. A sample dispatcher 40 (also referred to as sample introduction apparatus, sample injector, etc.) is provided between the pump 20 and the separating device 30 in order to subject or add (often referred to as sample introduction) portions of one or more sample fluids into the flow of the mobile phase. The stationary phase of the separating device 30 is adapted for separating compounds of the sample fluid, e.g. a liquid. A detector 50 is provided for detecting separated compounds of the sample fluid. A fractionating unit 60 can be provided for outputting separated compounds of sample fluid.

Figure 1:
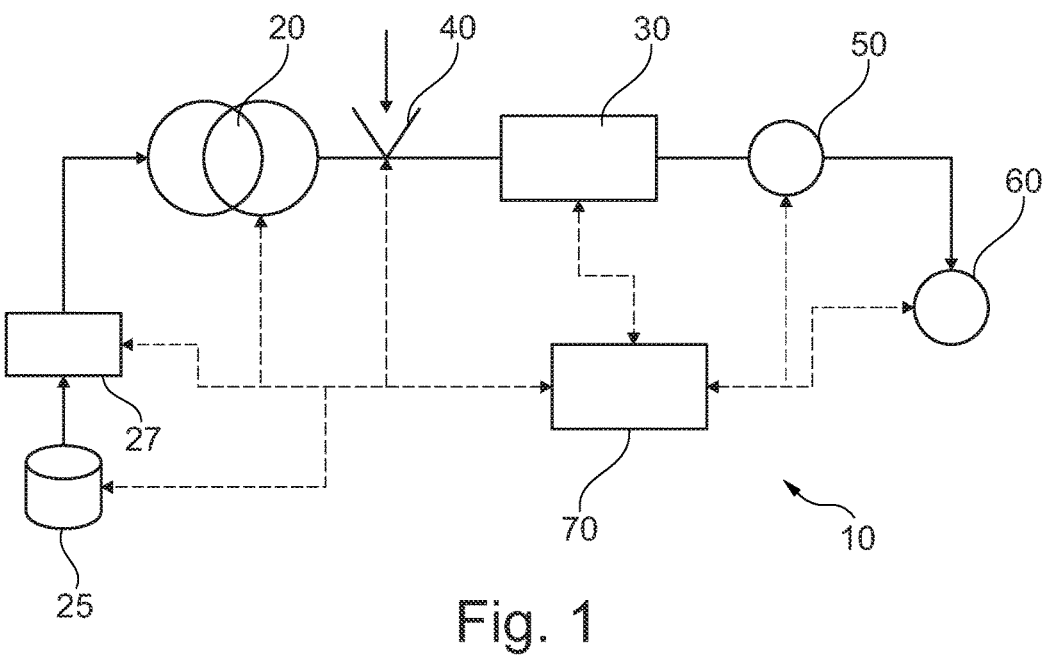
FIG. 1 illustrates a liquid separation system according to an exemplary embodiment.

While the mobile phase can be comprised of one solvent only, it may also be mixed of plurality of solvents. Such mixing might be a low pressure mixing and provided upstream of the pump 20, so that the pump 20 already receives and pumps the mixed solvents as the mobile phase. Alternatively, the pump 20 might be comprised of plural individual pumping units, with plural of the pumping units each receiving and pumping a different solvent or mixture, so that the mixing of the mobile phase (as received by the separating device 30) occurs at high pressure and downstream of the pump 20 (or as part thereof). The composition (mixture) of the mobile phase may be kept constant over time, the so-called isocratic mode, or varied over time, the so-called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the pump 20 (e.g., setting control parameters) and receive therefrom information regarding the actual working conditions (such as output pressure, flow rate, etc., at an outlet of the pump 20). The data processing unit 70 might also control operation of the solvent supply 25 (e.g., monitoring the level or amount of the solvent available) and/or the degasser 27 (e.g., setting control parameters such as vacuum level) and might receive therefrom information regarding the actual working conditions (such as solvent composition supplied over time, flow rate, vacuum level, etc.). The data processing unit 70 might further control operation of the sample dispatcher 40 (e.g., controlling sample introduction or synchronization of the sample introduction with operating conditions of the pump 20). The separating device 30 might also be controlled by the data processing unit 70 (e.g., selecting a specific flow path or column, setting operation temperature, etc.), and send—in return—information (e.g., operating conditions) to the data processing unit 70. Accordingly, the detector 50 might be controlled by the data processing unit 70 (e.g., with respect to spectral or wavelength settings, setting time constants, start/stop data acquisition), and send information (e.g., about the detected sample compounds) to the data processing unit 70. The data processing unit 70 might also control operation of the fractionating unit 60 (e.g., in conjunction with data received from the detector 50) and provide data back. Finally the data processing unit 70 might also process the data received from the system 10 or its part and evaluate it in order to represent it in adequate form prepared for further interpretation.

Figure 2:
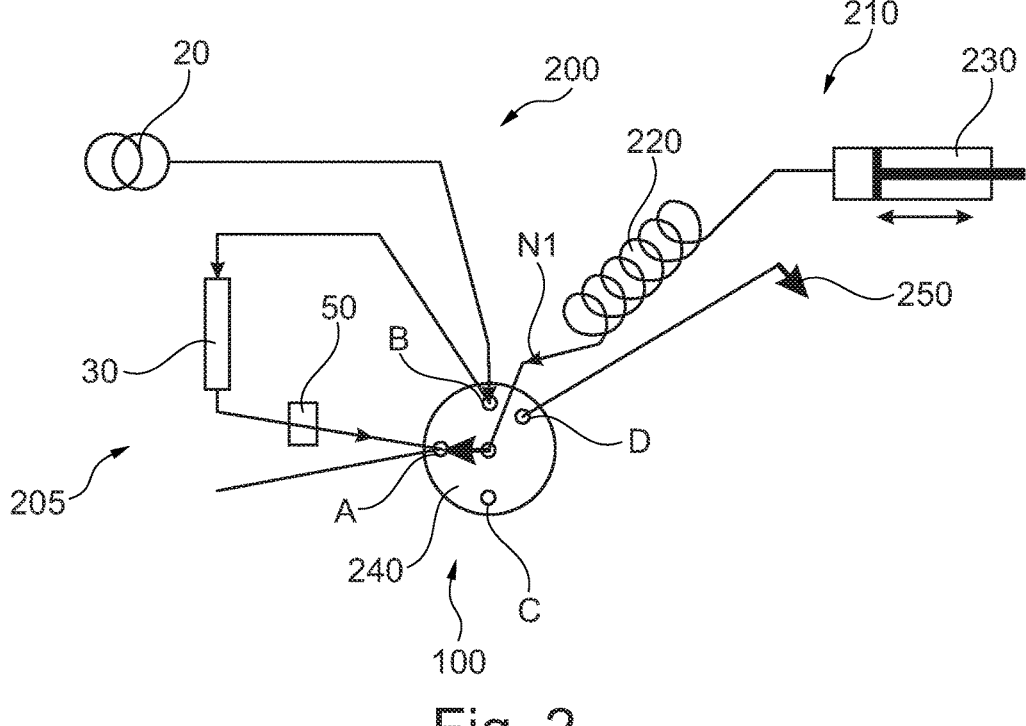
FIG. 2 schematically shows an embodiment of a fluid processing apparatus according to the present invention.

FIG. 2 schematically shows an embodiment of a fluid processing apparatus 100 according to the present invention comprising a first fluid separation apparatus 200. The first fluid separation apparatus 200 substantially corresponds in function to the liquid separation system 10 of FIG. 1, and only such features relevant for the understanding of the present invention shall be depicted in the schematic representation of FIG. 2. It is clear that additional features and components, e.g. such as shown in FIG. 1, may further be employed.

In the schematic representation of FIG. 2, the first fluid separation apparatus 200 comprises a first (high pressure) flow path 205 pressurized by the pump 20 configured for driving the mobile phase. A separation unit 30, preferably a chromatographic column and which may also be referred to in the following as column 30, is fluidically coupled downstream to the pump 20 and configured for separating a fluidic sample comprised within the mobile phase. An optional detector 50 may be coupled downstream to (i.e. after the outlet of) the column 30.

The fluid processing apparatus 200 further comprises a sampling unit 210 having a modulation buffering unit 220 and a modulation drive 230. A switching unit 240 is configured for fluidically coupling the sampling unit 210 with the first flow path 205. In a first switching state (indicated by reference numeral A) as schematically represented in FIG. 2, the switching unit 240 couples downstream to the column 30 for introducing fluid into the modulation buffering unit 220. The switching unit 240 can be operated into a second switching state (indicated by reference numeral B) for introducing fluid buffered in the modulation buffering unit 220 into the first flow path 205 between the pump 20 and the column 30. Fluid buffered in the modulation buffering unit 224 being introduced into the first flow path 205 during the second switching state B may be the same as or a portion of the fluid introduced into the modulation buffering unit 220 during the first switching state A. However, the fluid introduced into the first flow path 205 during the second switching state B may also be entirely different from and unrelated to the fluid introduced the modulation buffering unit 220 during the first switching state A, depending on the respective application of the fluid processing apparatus 100.

It is to be understood that the representation in FIG. 2 does not show respective fluidic paths for coupling the sampling unit 210 with the first flow path 205, but the representation in FIG. 2 is intended for illustrating where in the respective switching states A and B the sampling unit 210 fluidically couples with the first flow path 205. Such coupling can be in the sense of a point connection or a flow through connection. In a point connection, one end of the modulation buffering unit 220 is coupled to (e.g. a respective point within) the first flow path 205 in order to either withdraw fluid from or introduce fluid into the first flow path 205. In a flow through connection, the modulation buffering unit 220 is coupled with both ends into the first flow path 205 in order to either be filled with fluid from or introduce fluid into the first flow path 205. This will be explained in further detail later.

FIG. 2 further schematically represents a third switching state (indicated by reference numeral C) of the switching unit 240 allowing to either pressurizing or de-pressurizing a fluid content within the modulation buffering unit 220. This can be done e.g. in that the switching unit 240 fluidically blocks one end of the modulation buffering unit 220 while the modulation drive 230 is coupled to and acting on an opposite end of the modulation buffering unit 220. Alternatively, the modulation buffering unit 220 and the modulation drive 230 can be fluidically connected to each other and fluidically disconnected (blocked) from other fluidic connections, inlets and outlets in the corresponding switching state of the switching unit 240.

FIG. 2 also schematically represents an (external) switching state D of the switching unit 240 allowing to fluidically couple the sampling unit 210 with an external fluid unit 250, e.g. a vessel or other container or an online sample supply which may for example be coupled to a chemical and/or biological reactor for continuously monitoring samples thereof. This allows e.g. for providing fluid from the modulation buffering unit 220 (i.e. fluid buffered within the modulation buffering unit 220) to the external fluid unit 250, e.g. for further processing for example in a second-dimension HPLC unit. Alternatively or in addition, this allows e.g. for receiving fluid from such external fluid unit 250 and for introducing such fluid into the modulation buffering unit 220 for example for introducing to the column 30 (e.g. via the second switching state).

The embodiment of FIG. 2 allows usage of the modulation drive 230 for introducing sample after passing the column 30 into the modulation buffering unit 220 (which may be referred to as sample aliquoting) as well as introducing sample buffered in the modulation buffering unit 220 into first flow path 205 between the pump 20 and the column 30 (which may be referred to as sample injection) in order to have such introduced sample being chromatographically separated by the column 30. It is clear that sample used for sample injection may be sample received from a previous sample aliquoting, e.g. in the sense of a multi-dimensional fluid separation, for example with a so-called single stack HPLC system as disclosed for example in DE102018114150A1 by the same applicant. Alternatively or in addition, sample used for sample injection may come from a different source such as the external fluid supply 250. Accordingly, sample aliquoting may also be done for storing such aliquoted sample and/or for further processing in the first fluid separation apparatus 200 or any other fluid processing unit.

Figure 3:
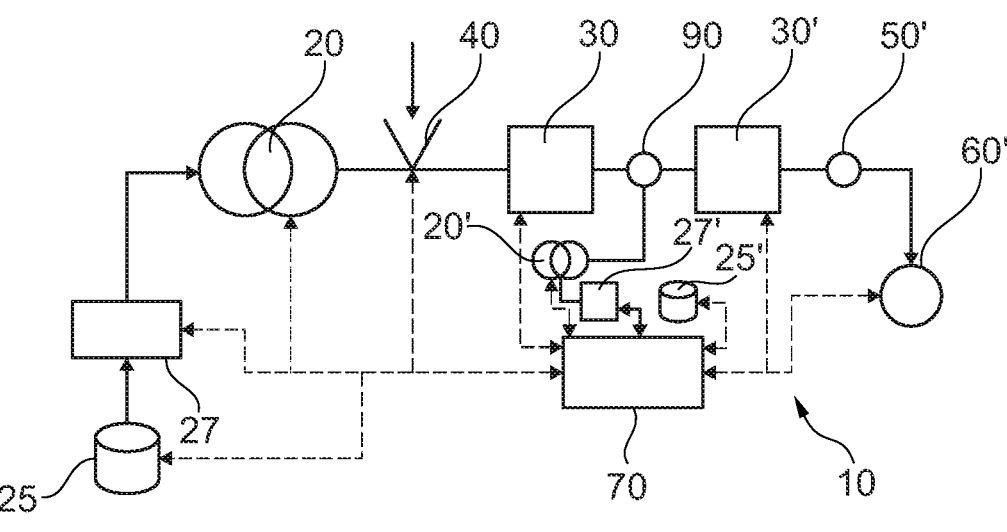
FIG. 3 schematically shows an embodiment of the liquid separation system in accordance with the embodiment of FIG. 1 but further provided to be used in two-dimensional chromatography (2D LC).

FIG. 3 schematically shows an embodiment of the liquid separation system 10 in accordance with the embodiment of FIG. 1 but further provided to be used in two-dimensional chromatography (2D LC). In 2D LC systems, usually the individual separations are operated independently. This means that there is one LC arrangement, which has a column for first-dimension separation, of which the outlet fluid, e.g. a liquid (or parts or portions thereof) may be transferred into the high-pressure path of the second dimension upstream of its column. If the separation in the second dimension is a periodic process, the fluid should only be introduced periodically and in portions (rather than continuously) into the high-pressure path of the second dimension. This may lead to some complex arrangements. On one hand the arrangement should park or temporarily store a certain amount of fluid coming from the first-dimension column and on the other hand it should bring the respective fluid plug or sniplet (which might be a fraction with regard to the sample of the first dimension and is a sample with regard to the second dimension) to the second-dimension column with minimum disturbance.

A second pump 20' receives another mobile phase (also denoted as fluid) from a second solvent supply 25', typically via a second degasser 27', which degases and thus reduces the amount of dissolved gases in the other mobile phase. By the modulation assembly 90, the first dimension (reference numerals 20, 30, . . . ) of the two-dimensional liquid chromatography system 10 of FIG. 1 may be fluidically coupled to the second dimension (reference numerals 20', 30', . . . ). The fluidic sample is separated into multiple fractions by the first dimension, and each fraction is further separated into multiple sub-fractions by the second dimension. A detector 50' is provided for detecting separated compounds of the sample fluid. A fractionating unit 60' can be provided for collecting separated compounds of sample fluid.

Similar as described with respect to FIG. 1, each of the mobile phases in FIG. 3 can be comprised of one solvent only, but may also be mixed from plural solvents. Such mixing might be a low pressure mixing and provided upstream of the pumps 20, 20', so that the respective pump 20, 20' already receives and pumps the mixed solvents as the mobile phase. Alternatively, each pump 20, 20' might be comprised of plural individual pumping units, with plural of the pumping units each receiving and pumping a different solvent or mixture, so that the mixing of the mobile phase (as received by the respective separating device 30, 30') occurs at high pressure and downstream of the pump 20, 20' (or as part thereof). Alternatively, the pumps 20, 20' may internally mix or proportionate multiple solvents and then pump the mixture into the system. The composition of the mobile phase may be kept constant over time, the so-called isocratic mode, or varied over time, the so-called gradient mode.

The data processing unit 70 is preferably configured to control both the first and second dimension, but it is clear that each dimension may be controlled also individually. For example, the data processing unit 70 might control operation of the pump 20, 20' (for instance setting control parameters) and receive therefrom information regarding the actual working conditions (such as output pressure, flow rate, etc.). The data processing unit 70 might also control operation of the solvent supply 25, 25' (for instance setting the solvent/s or solvent mixture to be supplied) and/or the degasser 27, 27' (for instance setting control parameters such as vacuum level) and might receive therefrom information regarding the actual working conditions (such as solvent composition supplied over time, flow rate, vacuum level, etc.). The data processing unit 70 might further control operation of the sampling unit 40 (for instance controlling sample injection or synchronizing sample injection with operating conditions of the pump 20). The respective separating device 30, 30' might also be controlled by the data processing unit 70 (for instance selecting a specific flow path or column, setting operation temperature, etc.), and send—in return—information (for instance operating conditions) to the data processing unit 70. Accordingly, the detector 50 might be controlled by the data processing unit 70 (for instance with respect to spectral or wavelength settings, setting time constants, start/stop data acquisition), and send information (for instance about the detected sample compounds) to the data processing unit 70. The data processing unit 70 might also control operation of the fractionating unit 60 (for instance in conjunction with data received from the detector 50) and provide data back.

In both sample separation dimensions (first dimension: pump 20, separating device 30; second dimension: pump 20', separating device 30') of the 2D-LC system shown in FIG. 3, operation may be performed in accordance with a volume-based control scheme, e.g. as outlined in the aforementioned WO2009062538A1, rather than by a time-based control scheme. Hence, the separation of the fractions and sub-fractions of the fluidic sample is performed in terms of delivered or run volumes rather than in terms of time slices.

Figure 4:
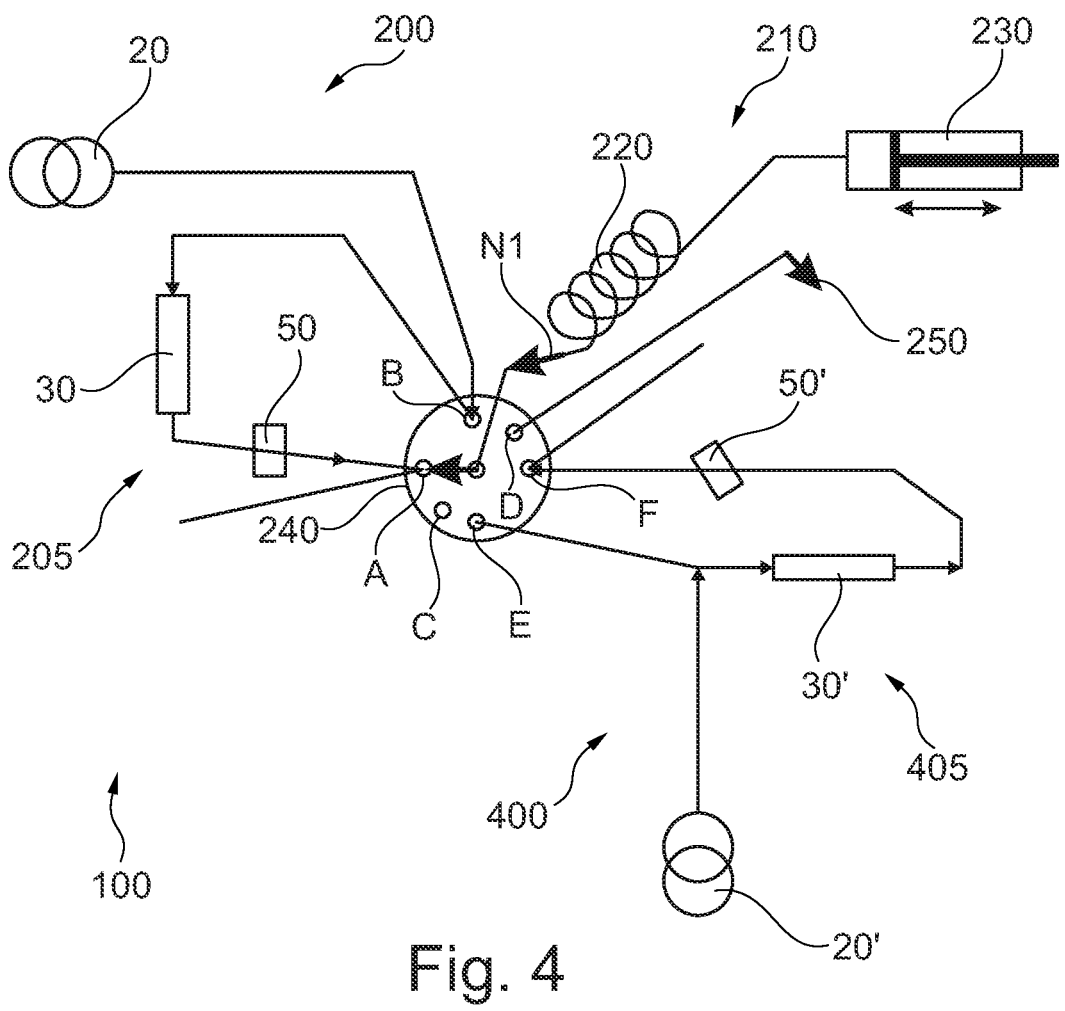
FIG. 4 schematically shows another embodiment of the fluid processing apparatus according to the present invention.

FIG. 4 schematically shows an embodiment of the fluid processing apparatus 100 according to the present invention, which substantially corresponds in function to the 2D LC liquid separation system 10 of FIG. 3. The fluid processing apparatus 100 in FIG. 4 also corresponds with the embodiment shown in FIG. 2, however, additionally comprising a second fluid separation apparatus 400. In other words, the fluid processing apparatus 100 comprises the first fluid separation apparatus 200, the second fluid separation apparatus 400, the sampling unit 210 (comprising the modulation buffering unit 220 and the modulation drive 230) and the switching unit 240. The switching unit 240 couples to both the first and second fluid separation apparatuses 200 and 400 and allows fluid transfer provided by the sampling unit 210, as will be explained in greater detail below. Such fluid transfer provided by the sampling unit 210 comprises (a) a transfer of fluid from external, such as from the external fluid unit 250, to at least one of the first and second fluid separation apparatuses 200 and 400, (b) a transfer of fluid to external, such as to the external fluid unit 250, from either one or both of the first and second fluid separation apparatuses 200 and 400, (c) a transfer of fluid within either one of the first and second fluid separation apparatuses 200 and 400, and (d) a transfer of fluid between the first and second fluid separation apparatuses 200 and 400.

In the schematic representation of FIG. 4, the second fluid separation apparatus 400 comprises a second (high pressure) flow path 405 pressurized by the pump 20' configured for driving the (second) mobile phase. Column 30' is fluidically coupled downstream to the pump 20' and configured for separating a fluidic sample when comprised within the second mobile phase. Optional detector 50' may be coupled downstream to (i.e. after the outlet of) the column 30'.

The switching unit 240 is configured for fluidically coupling the sampling unit 210 with the (first-dimension) high pressure flow path 205 as well as with the (second-dimension) high pressure flow path 405. Beyond the first, second, third, and external switching states A-D, as already explained with respect to FIG. 2, the switching unit 240 as schematically represented in FIG. 4 comprises a fourth switching state (or further switching state) for introducing fluid buffered in the modulation buffering unit 220 in or into the second-dimension flow path 405 between the second fluid pump 20' and the second chromatographic column 30' (indicated by reference numeral E). In a fifth switching state (or additional switching state) of the switching unit 240, as indicated by reference numeral F, the switching unit 240 is coupling downstream of the second chromatographic column 30' allowing to introduce fluid (from downstream of the second chromatographic column 30') into the modulation buffering unit 220. The fourth switching state (or further switching state) thus allows a sample injection into the second fluid separation apparatus 400, while the fifth switching state (or additional switching state) allows an aliquoting of sample fluid from the output of the second fluid separation apparatus 400.

In the external switching state D in FIG. 4, the switching unit 240 allows to fluidically couple the sampling unit 210 with the external fluid unit 250 for providing fluid from the modulation buffering unit 220 (i.e. fluid buffered within the modulation buffering unit 220) to the external fluid unit 250, and/or for receiving fluid from such external fluid unit 250 and for introducing such fluid into the modulation buffering unit 220 for example for introducing to either one or both of the column 30 and 30' (e.g. via the second and fourth switching states).

It is to be understood that the representation in FIG. 4 (as well as in FIG. 2) does not show respective fluidic paths for coupling the sampling unit 210 with the first and second high pressure flow paths 205 and 405, but the representation in FIG. 4 is intended for illustrating where in the respective switching states A-F the sampling unit 210 fluidically couples with the high pressure flow paths 205 and 405. Such coupling can also be in the sense of point connection or flow through connection as will be explained in further detail later.

The embodiment of FIG. 4 allows usage of the modulation drive 230 for introducing sample after passing at least one of the columns 30 and 30' into the modulation buffering unit 220 (which may be referred to as sample aliquoting) as well as introducing sample buffered in the modulation buffering unit 220 into either one or both of the first and second high pressure flow paths 205 and 405 (which may be referred to as sample injection) in order to have such introduced sample be chromatographically separated by the respective column 30 and 30'. Accordingly, the sampling unit 210 allows aliquoting sample as output from each of the first and second high pressure flow paths 205 and 405, i.e., after passing the respective chromatographic column 30 and 30', and providing a sample injection of such aliquoted sample as input into either one or both of the first and second high pressure flow paths 205 and 405, i.e. before passing the respective chromatographic column 30 and 30'.

It is clear that sample used for sample injection may also be sample received from a previous sample aliquoting, e.g. in the sense of a so-called single stack HPLC system as disclosed for example in DE102018114150A1 by the same applicant. Alternatively or in addition, sample used for sample injection may come from a different source such as the external fluid supply 250.

In both embodiments of FIGS. 2 and 4, the modulation buffering unit 220 can be or comprise a sample loop or any other reservoir suitable for fluid buffering. The modulation drive 230 may be or comprise at least one of: a syringe, a syringe pump, a pump, and a pumping unit comprising a plurality of pumps, a piston pump, preferably a reciprocating piston pump, a dual pump comprising two piston pumps connected in parallel or serial to each other, a multi-stage step-piston pump having a single piston with at least two sections of different diameters, and a modulation pump being capable of intaking and ejecting at least a limited amount of fluid via the same connection port/conduit.

Further in both embodiments of FIGS. 2 and 4, an optional needle-seat coupling N1 can be implemented enabling sample draw and manipulation with external sources (e.g. vials). The needle-seat coupling N1 comprises (not detailed in the FIGS. 2 and 4) a needle and a needle seat which can be coupled together in a fluid tight manner. The needle can be physically separated from the needle seat e.g. for aspirating a fluid from such external sources. Before and during aspirating, the switching unit 240 is preferably moved into the third switching state C (i.e. in a "blind" position). After aspirating and moving the needle into the seat, the modulation drive 230 can then be operated to compress the fluid content within the modulation buffering unit 220 content before connecting to the first and/or second flow path 205 and 405.

Preferably a "blind" position, characterized by that the switching unit 240 does not connect the central port to any other flow path (position C or an equivalent "blind" position), is selected next to the injection point of the corresponding flow path (e.g. port B for path 205 or port E). Thus switching the switching unit 240 from compression position to the injection position can occur without intermittently establishing other (undesired) fluidic connections. Similarly to port/position C suitable for compression prior to connecting the sampling unit 210 to port E, a blind position between ports A and B is possible as compression position prior to connecting the sampling unit 210 to port B.

FIGS. 5A-5H illustrate in greater detail a generic switching schema of the fluid processing apparatus 100 according to FIG. 4 with an embodiment of the switching unit 240 as a rotational valve. The rotational valve is comprised of a rotor and a stator configured to allow a rotational movement with respect to each other as well known in the art and which needs not be further explained here. Rotor and stator may each comprise one or more ports (for fluidically coupling to and from the switching unit 240) and/or one or more grooves (and/or other fluidic channels) for providing fluidic connections e.g. within the valve. It is clear that the shown configuration of ports and grooves in FIG. 5 is only exemplary and for the sake of illustration of the set of possible and useful addressable switching or connection states, and that other embodiments can be used as well. It is also clear that depending on the specific implementation only a subset of the shown switching states may be required and implemented, thus reducing the complexity of the switching unit according to a specific application need. Also, it is clear that other type of valves may be used accordingly, such as translatory valves providing a translatory relative movement between stator and movable member.

Figures 5A, 5B:
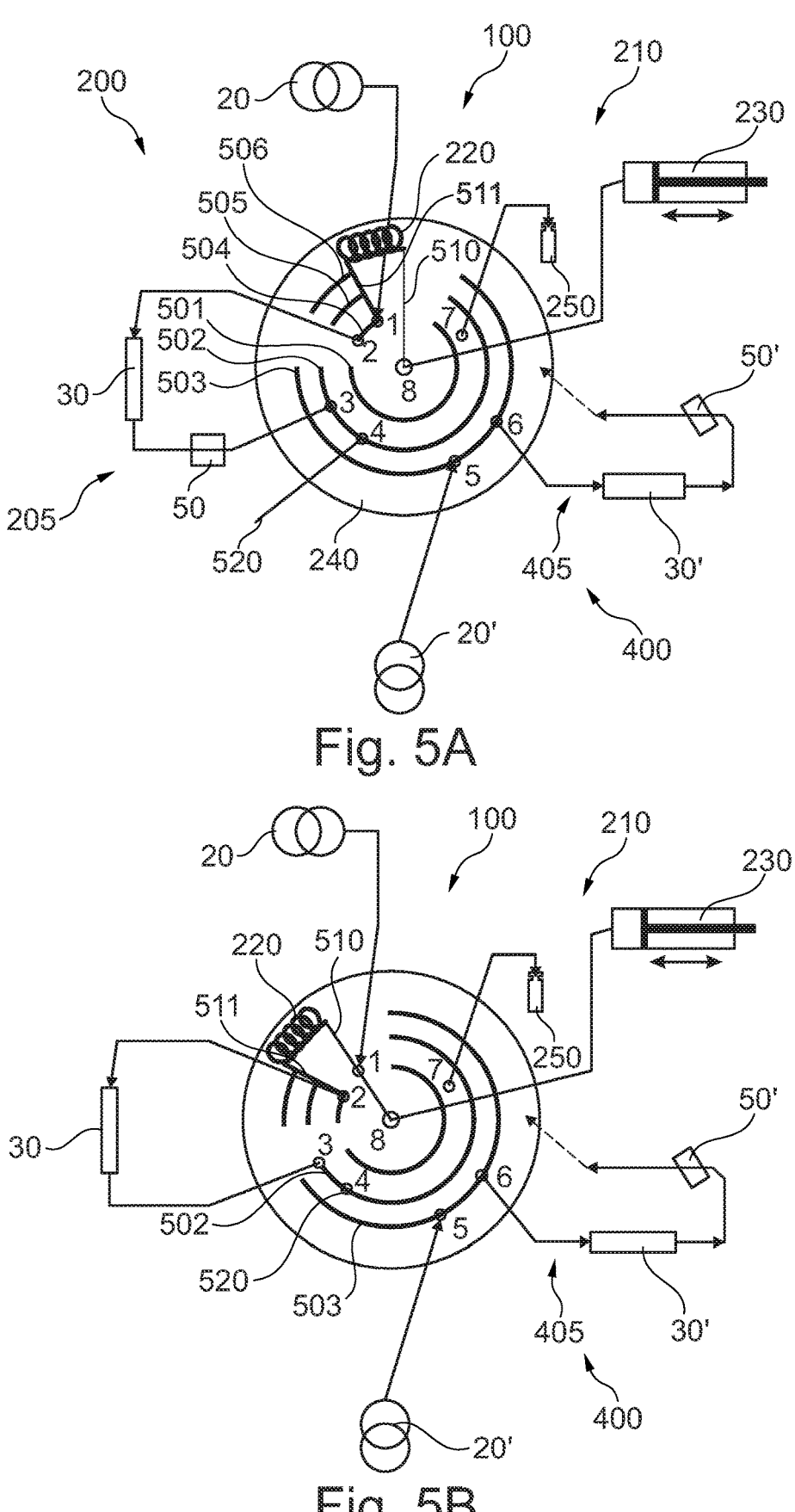
FIG. 5A illustrates in greater detail the fluid processing apparatus according to FIG. 4 in one switching state.
FIG. 5B illustrates the fluid processing apparatus shown in FIG. 5A in another switching state.
Figures 5C, 5D:
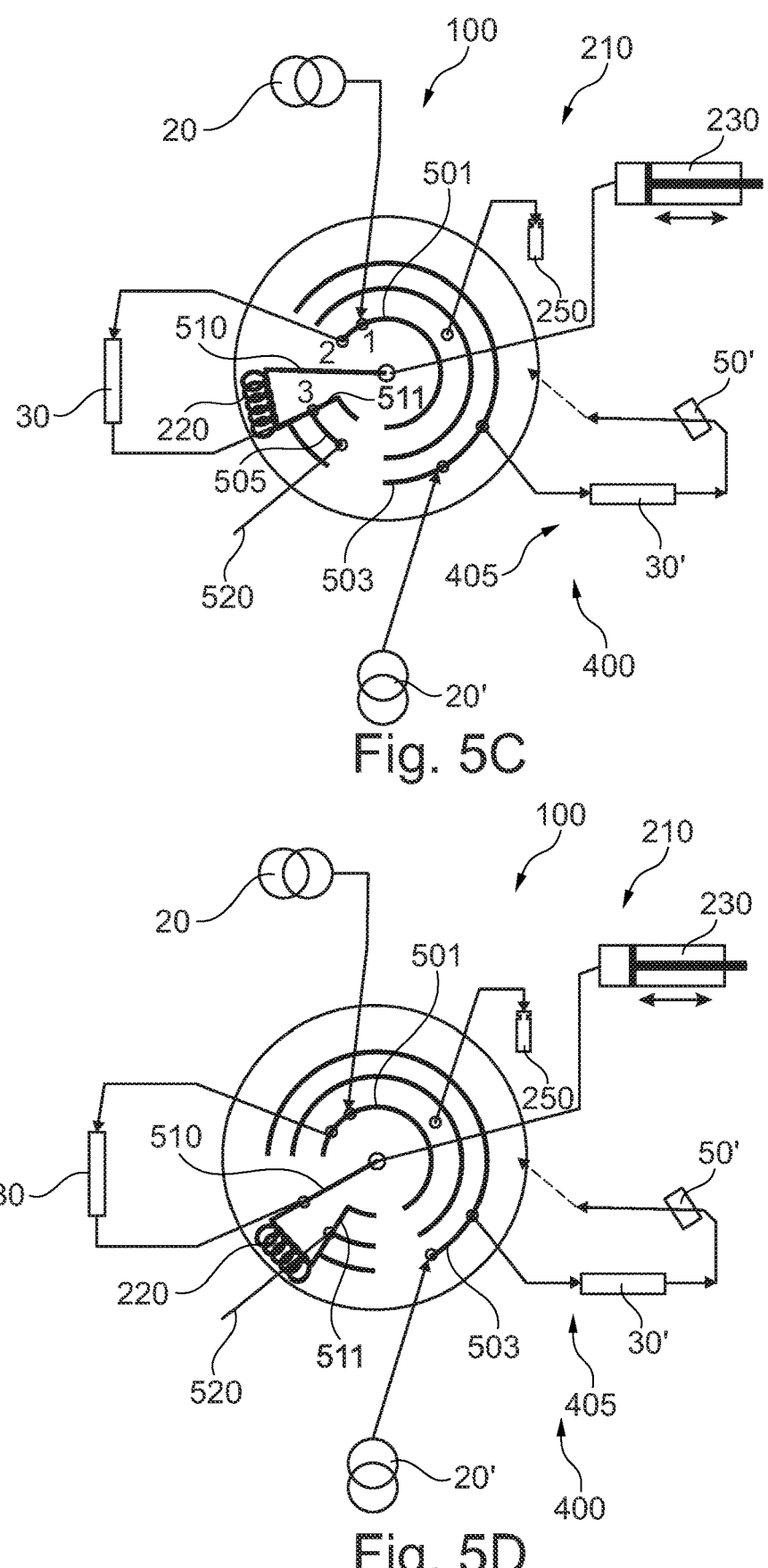
FIG. 5C illustrates the fluid processing apparatus shown in FIG. 5A in another switching state.
FIG. 5D illustrates the fluid processing apparatus shown in FIG. 5A in another switching state.

It is to be understood that the switching unit 240 need not necessarily be operated in the sequence as shown in FIGS. 5A-5H, i.e. the switching unit 240 need not necessarily be moved from the switching state shown in FIG. 5A into the switching state shown in FIG. 5B, then from the switching state shown in FIG. 5B into the switching state shown in FIG. 5C, and so on. It is clear that dependent on the respective application the switching unit 240 may be moved in any sequence of switching states, and/or that not all of the shown switching states may be required for certain applications. As an example, a certain application may only use either feed injection (as depicted in FIG. 5A) or flow through injection (as depicted in FIG. 5B) but not both.

While the embodiment of FIG. 5 shows that various kinds of switching states can be embodied in a single valve configuration, it goes without saying that the same functionality or a reduced number of switching states can be embodied with different valve configurations, e.g. by employing one or more individual valves, which may be any kind of valve types, such as rotational valves, translatory valves, and/or check valves.

The switching unit 240 in the embodiment of FIGS. 5A-5H is a rotational valve with eight ports 1-8, six circular grooves 501-506, and two radial grooves 510 and 511. Port 8 is arranged centrally and provides the pivoting point of the rotational valve. Ports 1 and 2 are provided in a first peripheral circuit around central port 8, with circular grooves 501 and 504 providing circular segments of and being rotatable along that first peripheral circuit. Ports 3 and 4 are provided in a second peripheral circuit (being more peripheral than the first peripheral circuit) around central port 8, with circular grooves 502 and 505 providing circular segments of and being rotatable along that second peripheral circuit. Ports 5 and 6 are provided in a third peripheral circuit (being more peripheral than the second peripheral circuit) around central port 8, with circular grooves 503 and 506 providing circular segments of and being rotatable along that third peripheral circuit.

Central port 8 couples via a radial groove 510 to one end of the modulation buffering unit 220 (embodied here as a loop being part of the rotor), and the other end of the modulation buffering unit 220 is coupled via radial groove 511 to all three of the circular grooves 504, 505, and 506. The radial grooves 510 and 511 may also be referred to as longitudinal grooves.

It is clear that the buffering unit 220 does not have to be implemented as part of the rotor but can be coupled e.g. via stator ports as known in the art, for example by using circular grooves or the like.

The first fluid pump 20 is coupling to port 1. Port 2 couples to one end of the first chromatographic column 30, and port 3 couples to the other end of the first chromatographic column 30 either directly or indirectly (as shown here) via the first detector 50. Port 4 couples to a conduit 520 which may further be coupled to waste or any other additional unit.

The second fluid pump 20' is coupling to port 5. Port 6 couples to one end of the second chromatographic column 30'. The other end of the second chromatographic column 30' may also be coupled to the switching unit 240 in order to provide the fifth switching state, which for the sake of simplicity is not shown in the embodiment of FIG. 5 but only indicated by the dotted arrow. Port 7 couples to the external fluid source 250, and the modulation drive 230 is coupled to the central port 8.

FIG. 5A illustrates the second switching state B (sample injection) of the switching unit 240 in the sense of a so-called "feed injection" as described also in the afore-mentioned US2017343520A1, allowing to combine a flow from the sampling unit 210 with a flow from the first fluid pump 20 towards the first chromatographic column 30 for injecting sample into the first flow path 205 (for separating by the first column 30).

In FIG. 5A, port 1 represents a coupling point in the first flow path 205 between the first pump 20 and the first column 30 to which also the sampling unit 210 couples. Port 1 shall be denoted here as "a second coupling point", while a first coupling point will be described in FIG. 5C.

As apparent from the valve schematics in FIG. 5A, a fluidic path is provided from the modulation drive 230 (coupling to the central port 8) via radial groove 510 to the modulation buffering unit 220 and via the radial groove 511 to the second coupling point of port 1. By providing a movement (into the left direction indicated by the arrow in FIG. 5A), the modulation drive 230 can pressurize the fluid content within the modulation buffering unit 220. At the second coupling point (port 1) the pressure will be approximately the output pressure of the first pump 20, which in an HPLC application may be in the range of 500-1500 bar. When the pressure provided by the modulation drive 230 reaches or exceeds the pressure at the second coupling point (port 1), the flow from the first pump 20 and the flow provided by the modulation drive 230 will combine into a flow towards the first column 30, thus allowing to inject the fluid content buffered in the modulation buffering unit 220, or at least a part thereof, into the first mobile phase (provided by the first pump 20) towards the first column 30. Such injected fluid content, which may be a sample fluid, can then be chromatographically separated by the first column 30. At the same time, circular groove 503 couples between ports 5 and 6, thus coupling the second pump 20' to the second column 30'. Additional check valve(s) may be provided e.g. in order to ensure a certain flow direction all, the other way around, to ensure that there is no flow into a certain direction.

FIG. 5B illustrates the second switching state B of the switching unit 240 in the sense of the so-called "flow through injection" or "loop injection" as described also in the afore-mentioned US20160334031A1, wherein the modulation buffering unit 220 is coupled in the flow path between the first fluid pump 20 and the first chromatographic column 30 for introducing the fluid content within the modulation buffering unit 220 into the first flow path 205 and towards the chromatographic column 30 (for chromatographically separating such fluid content by the column 30).

As apparent from the valve schematics in FIG. 5B, the rotor of the switching unit 240 takes position 30° counter clockwise with respect to FIG. 5A. The switching unit 240 may be moved into that position of FIG. 5B after injection provided in the position shown in FIG. 5A, for example to wash any sample fluid, remaining in the modulation buffering unit 220 (and other components) after execution of the feed injection, e.g. towards the first chromatographic column 30. Radial groove 510 now couples to port 1 thus coupling the first pump 20 to one end of the modulation buffering unit 220. Radial groove 511 couples to port 2 thus coupling the other end of the modulation buffering unit 220 to one end of the first column 30, while the other end of the first column 30 couples to waste 520 via ports 3 and 4 (which are connected by the circular groove 502). Any fluid content within the modulation buffering unit 220 will be injected into the first mobile phase and driven by the first fluid pump 20 over the first chromatographic column 30. The modulation drive 230 still couples via the central port 8 to the radial groove 510 and thus to the first flow path 205. The modulation drive 230 stops movement so that no flow from the first pump 20 is allowed to flow towards the modulation drive 230. At the same time, circular groove 503 couples between ports 5 and 6, thus coupling the second pump 20' to the second column 30'. Thus, whereas the switching state of FIG. 5A illustrates a feed injection onto the first chromatographic column 30, the switching state of FIG. 5B illustrates a flow-through injection onto first chromatographic column 30.

FIG. 5C illustrates the first switching state, corresponding to state A in the FIG. 4—in a draw mode—of the switching unit 240 allowing a so-called "1 D-outlet aliquoting" for introducing fluid into the modulation buffering unit 220 from downstream of the first chromatographic column 30. In the schematics of FIG. 5C, the rotor of the switching unit 240 takes position 30° counter clockwise with respect to FIG. 5B. The first pump 20 couples to the first column 30 via circular groove 501. The other end or outlet of the first column 30 couples via port 3 to radial groove 511 which is coupled by the circular groove 505 to conduit 520 (which may lead to waste). The modulation drive 230 still couples via radial groove 510 to the modulation buffering unit 220 which on the other end (also) is coupled by a port 3 to the radial groove 511 and thus to the outlet of the first column 30. Port 3 represents the first coupling point within the first flow path 205 and allows the modulation drive 230 to draw fluid output from the first column 30 into the modulation buffering unit 220. At the same time, circular groove 503 couples between ports 5 and 6, thus coupling the second pump 20' to the second column 30'.

FIG. 5D illustrates the first switching state A—in a flow-through mode—of the switching unit 240 also allowing "1 D-outlet aliquoting" for introducing fluid into the modulation buffering unit 220 from downstream of the first chromatographic column 30. FIG. 5D is a functional counter-part of the first switching state A, however, the fluid transfer into the modulation buffering unit 220 occurs in this switching state in a "flow through" mode, i.e. not controlled by operation of the modulation drive 230, but rather forced by the effluent flow out from the first chromatographic column 30. Optionally, the modulation drive 230 can dispense additional solvent through the radial groove 510 into the modulation buffering unit 220 in order to dilute the aliquot or adjust its composition during aliquoting, if required.

In the schematics of FIG. 5D, the rotor of the switching unit 240 takes position 30° counter-clockwise with respect to FIG. 5C. The first pump 20 couples to the first column 30 via circular groove 501. The other end or outlet of the first column 30 now couples to radial groove 510. The modulation buffering unit 220 is coupled between the radial grooves 510 and 511, and radial groove 511 is further coupled to conduit 520 which may lead to waste. Accordingly, all fluid output from the first chromatographic column 30 will "flow through" and accordingly fill the modulation buffering unit 220. At the same time, circular groove 503 couples between ports 5 and 6, thus coupling the second pump 20' to the second column 30'.

Figures 5E, 5F:
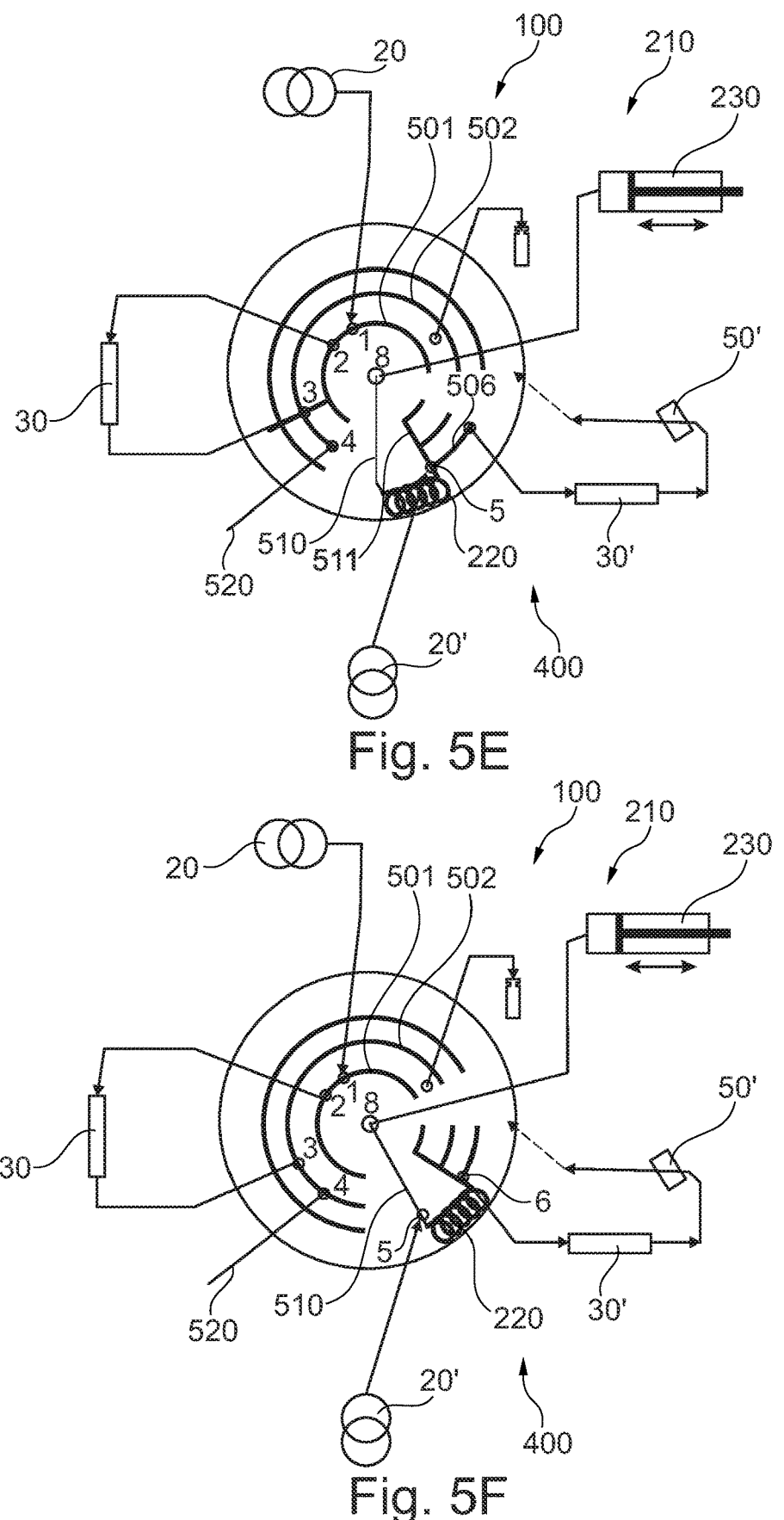
FIG. 5E illustrates the fluid processing apparatus shown in FIG. 5A in another switching state.
FIG. 5F illustrates the fluid processing apparatus shown in FIG. 5A in another switching state.

FIG. 5E illustrates the fourth switching state E, so called "2D-injection", in a "feed injection" mode for introducing fluid buffered in the modulation buffering unit 220 in or into the second flow path 405 between the second fluid pump 20' and the second chromatographic column 30'. In the schematics of FIG. 5E, the rotor of the switching unit 240 takes position 30° counter clockwise with respect to FIG. 5D. The second pump 20' couples at port 5 to circular groove 506 which is coupled to port 6 and thus to the second chromatographic column 30'. Modulation drive 230 at port 8 couples via radial groove 510 to one end of the modulation buffering unit 220, while the other end of the modulation buffering unit 230 is also coupled to port 5. Accordingly, port 5 represents a third coupling point in the second flow path 405 between the second fluid pump 20' and the second chromatographic column 30' allowing the sampling unit 210 to introduce a fluid content buffered in the modulation buffering unit 220 into the third coupling point of port 5—in the sense of the so-called "feed injection"—by combining a flow from the second fluid pump 20' with a flow from the modulation buffering unit 220 as provided by operation of the modulation drive 230. At the same time, circular groove 501 couples between ports 1 and 2, thus coupling the first pump 20 to the first chromatographic column 30 which is coupled via port 3 and 4 and circular groove 502 to conduit 520 and thus may be to waste.

FIG. 5F illustrates the fourth switching state E, so called "2D-injection", in a "flow-through" mode for introducing fluid buffered in the modulation buffering unit 220 in or into the second flow path 405 between the second fluid pump 20' and the second chromatographic column 30'. In the schematics of FIG. 5F, the rotor of the switching unit 240 takes position 30° counter clockwise with respect to FIG. 5E. The second pump 20' couples to port 5. The second chromatographic column 30' couples at port 6, and the modulation buffering unit 220 is coupled between ports 5 and 6. Accordingly, any fluid content buffered in the modulation buffering unit 220 will be flown through by the second mobile phase provided from the second fluid drive 20' and provided to the second chromatographic column 30'. Modulation drive 230 at port 8 couples via radial groove 510 also to port 5. At the same time, circular groove 501 couples between ports 1 and 2, thus coupling the first pump 20 to the first chromatographic column 30 which is coupled via port 3 and 4 and circular groove 502 to conduit 520 and thus may be to waste.

Figures 5G, 5H:
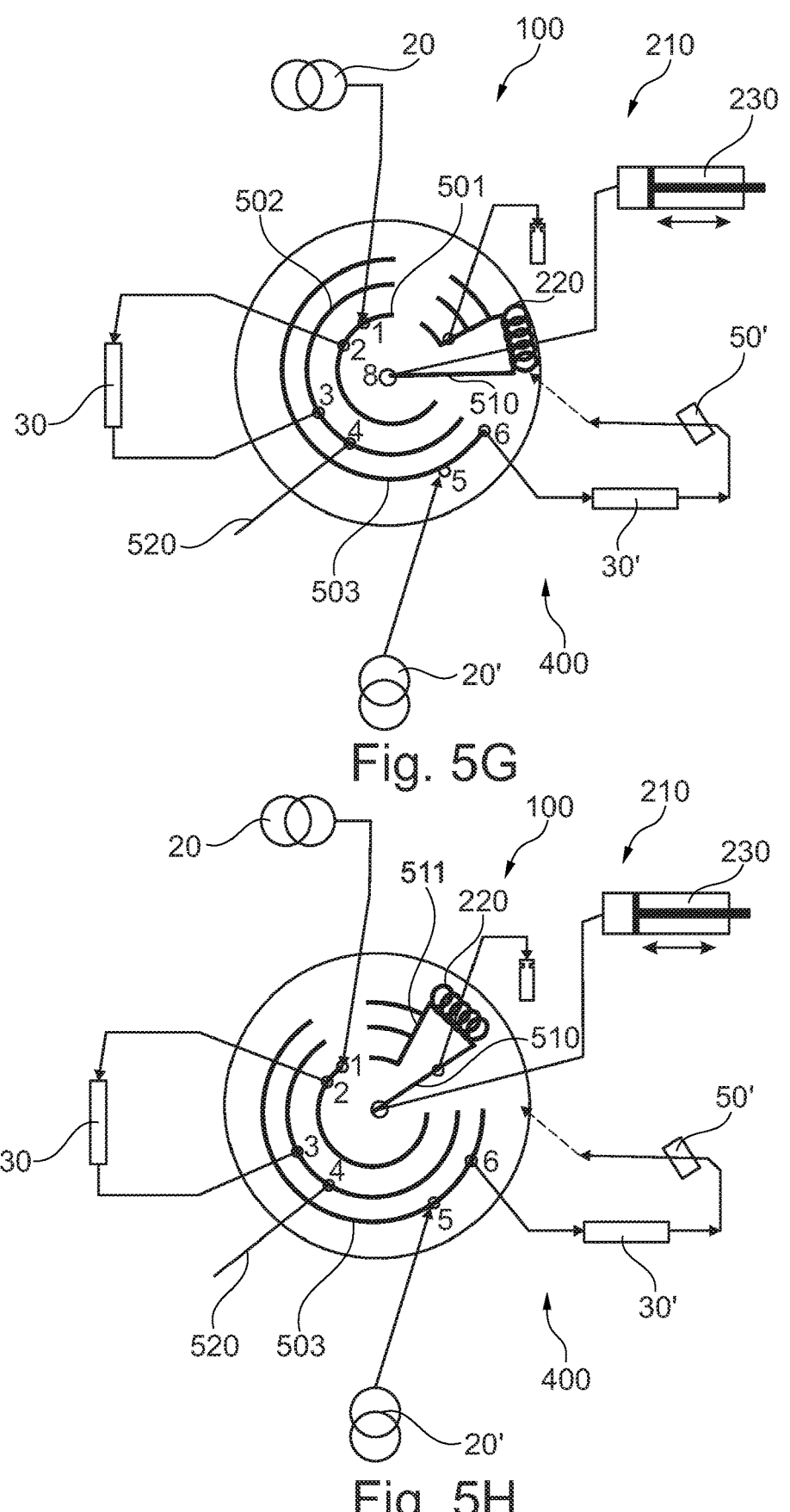
FIG. 5G illustrates the fluid processing apparatus shown in FIG. 5A in another switching state.
FIG. 5H illustrates the fluid processing apparatus shown in FIG. 5A in another switching state.

FIG. 5G illustrates the fifth switching state F, so called "2D-outlet aliquoting", for introducing fluid into the modulation buffering unit 220 from downstream of the second chromatographic column 30' in a "feed mode". This switching state is not further detailed in the FIGS. 5A-H. In a specific and more detailed embodiment, there is one more commutation ring similar to the three already shown, whereas said additional ring could accommodate the (not shown) ports 7 and 8 coupling to the outlet of the second chromatographic column 30' and waste, similarly to the ports 3 and 4 with respect to the first chromatographic column 30. These ports could be situated e.g. in the (not shown) additional commutation ring at angle positions centrally opposite (symmetrical over the valve rotation axis) to the ports 3 and 4.

FIG. 5G exemplarily shows a valve position enabling sample taking as a sample draw from the sample vial 250 by means of a sample needle (not detailed in FIG. 5G). The sample can be drawn from the vial 250 into the sample loop 220, while a chromatographic separation or column regeneration may still be running in the first chromatographic column 30, connected with its inlet to the fluidic drive 20 over the ports 1,2 and with its outlet to the waste 520 via the ports 3,4 and optionally through a detector. Also, a separation in the second chromatographic column 30' may still be running, as the inlet of second chromatographic column 30' is connected to the fluidic drive (second fluid pump 20') via the ports 5,6.

In the schematics of FIG. 5G, the rotor of the switching unit 240 takes position 30° counter clockwise with respect to FIG. 5F. The second pump 20' couples to port 5. The second chromatographic column 30' couples at port 6, and the circular groove 503 is coupled between ports 5 and 6 thus directly coupling the second pump 20' with the second chromatographic column 30'. The outlet from the second chromatographic column 30' (maybe after passing an optional second detector 50') is coupled to the switching unit 240. Modulation drive 230 at port 8 couples via radial groove 510, the modulation buffering unit 220, and the longitudinal drive groove 511. This allows the modulation drive 230 to draw fluid from the outlet of the second chromatographic column 30' into the modulation buffering unit 220. At the same time, circular groove 501 couples between ports 1 and 2, thus coupling the first pump 20 to the first chromatographic column 30 which is coupled via port 3 and 4 and circular groove 502 to conduit 520 and thus may be to waste.

FIG. 5H illustrates the fifth switching state F, so called "2D-outlet aliquoting", for introducing fluid into the modulation buffering unit 220 from downstream of the second chromatographic column 30' in a "flow-through mode". FIG. 5H shows a possible position of the valve, enabling purging or rinsing of the modulation drive 230 and of the sample needle with its according fluidic capillary/connections.

In the schematics of FIG. 5H, the rotor of the switching unit 240 takes position 30° counter clockwise with respect to FIG. 5G. The second pump 20' couples to port 5. The second chromatographic column 30' couples at port 6, and the circular groove 503 is coupled between ports 5 and 6 thus directly coupling the second pump 20' with the second chromatographic column 30'. The outlet from the second chromatographic column 30' (maybe after passing an optional second detector 50') is coupled to the switching unit 240. Accordingly, the modulation drive 230 will be flown through and filled with fluid from the outlet of the second chromatographic column 30'. At the same time, circular groove 501 couples between ports 1 and 2, thus coupling the first pump 20 to the first chromatographic column 30 which is coupled via port 3 and 4 and circular groove 502 to conduit 520 and thus may be to waste.

It is clear that the embodiment of the switching valve 240 of FIG. 5 is not optimized e.g. with respect to dead volumes and may accordingly be adapted or modified accordingly. Further, while the embodiment of FIG. 5 is suitable to cover both "flow-through" and "point coupling", it goes without saying that this may not be required for certain applications and the switching valve 240 may be simplified accordingly, e.g. to provide only one type of coupling, e.g. point coupling only as will be shown later with respect to FIG. 7.

Figures 6A, 6B:
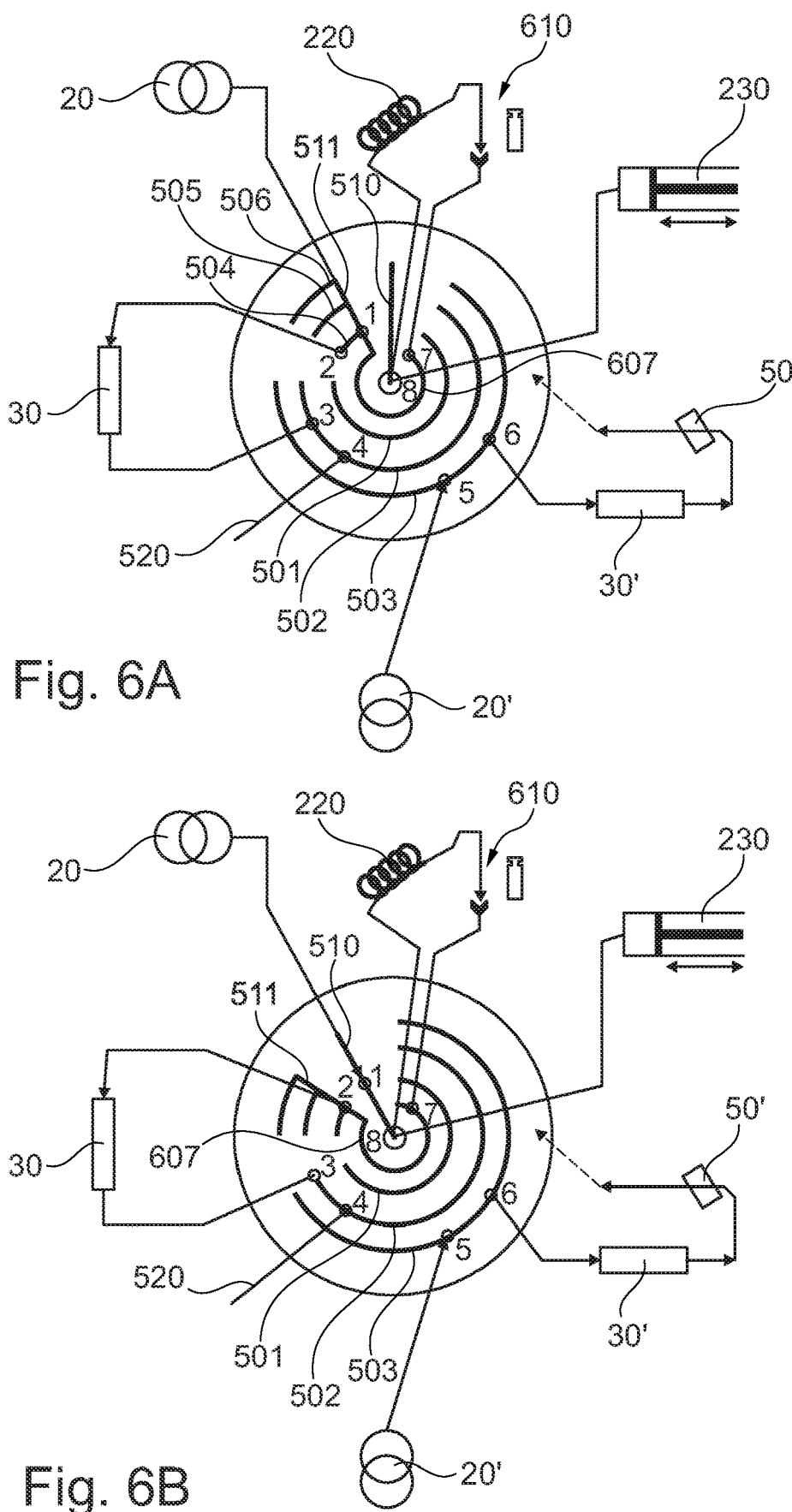
FIG. 6A illustrates in greater detail the fluid processing apparatus according to FIG. 4 with another embodiment of a switching unit of the fluid processing apparatus.
FIG. 6B illustrates the fluid processing apparatus shown in FIG. 6A in another switching state.

FIGS. 6A-6B illustrate in greater detail the fluid processing apparatus 100 according to FIG. 4 with another embodiment of the switching unit 240, also as a rotational valve. While in the embodiment of FIG. 5 the modulation buffering unit 220 is incorporated into the switching unit 240, the modulation buffering unit 220 in the alternative embodiment of FIG. 6 is external to the switching unit 240, so that the buffering unit 220 needs to be externally coupled to respective ports of the switching unit 240. The embodiments of FIGS. 5 and 6 substantially correspond with each other, so that only the differences need to be further illustrated here.

The switching unit 240 in the embodiment of FIG. 6 is also a rotational valve with eight ports 1-8, a plurality of circular grooves, and two radial grooves 510 and 511. Beyond the six circular grooves 501-506 (as in the embodiment of FIGS. 5), the embodiment of FIG. 6 further comprises a seventh circular groove 607 provided as a circular segment in an inner peripheral circuit between the first peripheral circuit and the central port 8. Port 7 is located in that inner peripheral circuit and may thus be coupled by the seventh circular groove 607. The seventh circular groove 607 is further coupled directly with radial groove 511.

The modulation buffering unit 220 couples with one end to the central port 8 while the other end thereof is coupled to port 7. An optional needle-seat configuration 610 (which may substantially correspond to the needle-seat coupling N1 in FIGS. 2 and 4) may also be coupled between ports 8 and 7, e.g. between one end of the modulation buffering unit 220 and the port 7 as shown here. The needle-seat configuration 610 comprises a needle and a seat (as schematically indicated here), wherein the needle can be physically detachable from the seat e.g. in order to aspirate an external fluid (such as a sample fluid) e.g. from a vial (as schematically indicated in FIG. 6). This is well known in the art and does not need to be explained in detail here.

Similar to FIG. 5A, FIG. 6A illustrates the second switching state B of the switching unit 240 in the sense of a so-called "feed injection" as described also in the aforementioned US2017343520A1, allowing to combine a flow from the sampling unit 210 (comprised of the modulation drive 230, the modulation buffering unit 220, and the needle-seat configuration 610) with a flow from the first fluid pump 20 towards the first chromatographic column 30. Port 1 represents the second coupling point in the first flow path 205 between the first pump 20 and the first column 30 to which also the sampling unit 210 couples. As apparent from the valve schematics in FIG. 6A, a fluidic path is provided from the modulation drive 230 (coupling to the central port 8) to the modulation buffering unit 220 and via the seventh circular port 607 to port 1. An additional stop position or position range accessible during rotative motion of the valve can be implemented, in which the sampling unit 210 is hydraulically blocked (sealed, such that by providing a movement (into the left direction indicated by the arrow in FIG. 5A), the modulation drive 230 can pressurize the fluid content within the modulation buffering unit 220.

At the second coupling point (port 1) the pressure will be approximately the output pressure of the first pump 20, which in an HPLC application may be in the range of 500-1500 bar. When the pressure provided by the modulation drive 230 reaches or exceeds the pressure at the second coupling point (port 1), the flow from the first pump 20 and the flow provided by the modulation drive 230 will combine into a flow towards the first column 30, thus allowing to inject the fluid content buffered in the modulation drive 230, or at least a part thereof, into the first mobile phase (provided by the first pump 20) towards the first column 30. Once connected to the first flow path 205, the modulation drive 230 can provide a flow of the fluid content buffered in the sampling unit 210, or at least a part thereof, such that it will combine into the first mobile phase provided by the first pump 20 towards the first column 30. Such injected fluid content, which may be a sample fluid, can then be chromatographically separated by the first column 30. At the same time, circular groove 503 couples between ports 5 and 6, thus coupling the second pump 20' to the second column 30'.

Similar to FIG. 5B, FIG. 6B illustrates the second switching state B of the switching unit 240 in the sense of a so-called "flow through injection" or "loop injection" as described also in the afore-mentioned US20160334031A1, wherein the modulation buffering unit 220 is coupled in the flow path between the first fluid pump 20 and the first chromatographic column 30 for introducing the fluid content within the sampling unit 210 or modulation buffering unit 220 or at least part thereof into the first flow path 205 and towards the chromatographic column 30 (for chromatographically separating such fluid content by the column 30). As apparent from the valve schematics in FIG. 6B, the rotor of the switching unit 240 is positioned slightly anticlockwise with respect to FIG. 6A. Radial groove 510 now couples to port 1 (and port 8) thus coupling the first pump 20 to one end of the modulation buffering unit 220. The seventh circular groove 607 couples to port 7 thus coupling the other end of the modulation buffering unit 220 to one end of the first column 30, while the other end of the first column 30 is coupled to waste 520 via ports 3 and 4 (which are connected by the circular groove 502). Fluid content within the modulation buffering unit 220 will be injected into the first mobile phase and driven by the first fluid pump 20 over the first chromatographic column 30. The modulation drive 230 still couples to the central port 8 (and thus to the first flow path 205), however, the modulation drive 230 stops movement so that no flow from the first pump 20 is allowed to flow towards the modulation drive 230. At the same time, circular groove 503 couples between ports 5 and 6, thus coupling the second pump 20' to the second column 30'.

Other positions of the rotor of the switching unit 240 in the embodiment of FIGS. 6, the same switching configurations—mutatis mutandis—as afore-described for the embodiment of FIG. 5 can be achieved as apparent for the skilled person and do not need to be further detail here.

FIGS. 7A-7F illustrate in greater detail the fluid processing apparatus 100 according to FIG. 4 with another embodiment of the switching unit 240. In contrast to the embodiments of FIGS. 5 and 6, the switching unit 240 of the embodiment of FIG. 7 only allows to couple the sampling unit 210 by so called point connection disclosed e.g. in EP3252463A1 by the same applicant. The switching unit 240 in the embodiment of FIG. 7 is a rotational valve with five peripheral ports 1-5, one central port 6, and one (rotatable) radial groove 710. Port 6 is arranged centrally at and provides the pivoting point of the rotational valve. Radial groove 710 couples on one end to the central port 6. By rotating the rotor, the radial groove 710 is also rotated around the central port 6, and the other end of the radial groove 710 may individually couple to each one of the peripheral ports 1-5. The first fluid pump 20 is coupling to port 1. One end of the first chromatographic column 30 also coupled to port 1, and the other end of the first chromatographic column 30 couples either directly or indirectly (as shown here) via the first detector 50 to port 2. Port 2 further couples to the conduit 520 which may further be coupled to waste or any other additional unit. Port 3 couples to the second fluid pump 20' as well as to one end of the second chromatographic column 30'. The other end of the second chromatographic column 30' is coupled to port 4, either directly or via optional detector 50' as indicated in FIG. 7. A conduit 720 may also be coupled to port 4. Similar to the conduit 520, the conduit 720 may be further coupled to waste or any additional unit. Port 5 couples to the external fluid source 250. The sampling unit 210 is coupled to the central port 6, so that the modulation buffering unit 220 is coupled between central port 6 and the modulation drive 230. In accordance with the embodiment of FIGS. 6, the optional needle-seat configuration 610 may also be coupled between the sampling unit 210 and port 6, e.g. between one end of the modulation buffering unit 220 and the port 6 as shown here. Alternatively, a needle may be coupled to the peripheral port 5 or an additional (not shown) peripheral port, such that sample or other fluidic material can be transported from an external source such as a vial to the buffering unit 220 via the radial groove 710 when the switching unit 240 couples the central port 6 to the needle 377 via the corresponding port 5 or an additional not shown port.

In the embodiment of FIGS. 7, port 2 represents the first coupling point in the first flow path 205 allowing the sampling unit 210, coupled now downstream to the first column 30, to draw fluid into the modulation buffering unit 220. Port 1 represents the second coupling point in the first flow path 205 allowing the sampling unit 210 to introduce fluid buffered in the modulation buffering unit 220 between the first pump 20 and the first column 30. Port 3 represents the third coupling point in the second flow path 405 allowing the sampling unit 210 to introduce fluid buffered in the modulation buffering unit 220 between the second pump 20' and the second column 30'. Port 4 represents the fourth coupling point in the second flow path 405 allowing the sampling unit 210 to draw into the modulation buffering unit 220 fluid downstream to the second column 30'.

Figures 7A, 7B:
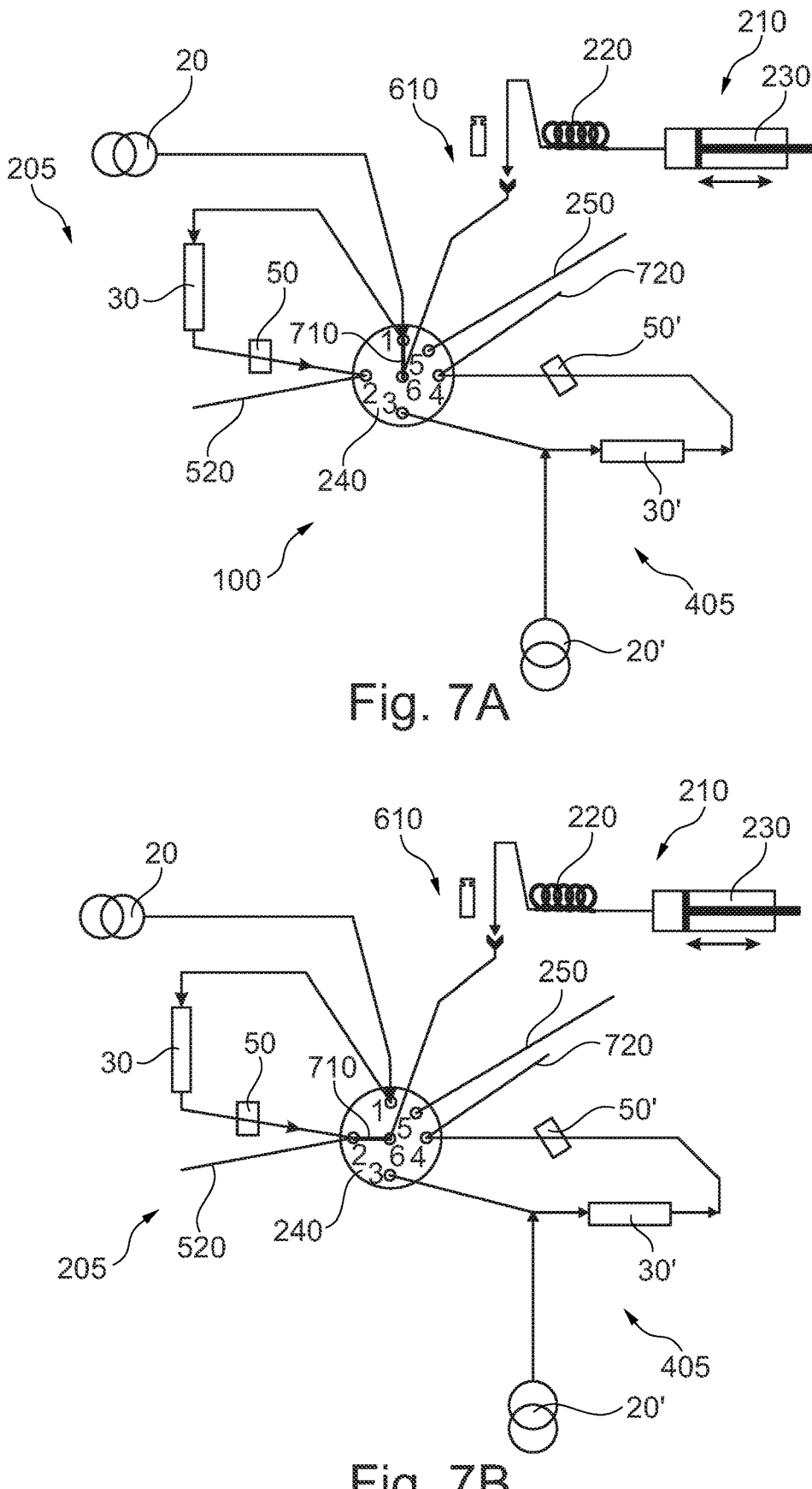
FIG. 7A illustrates in greater detail the fluid processing apparatus according to FIG. 4 with another embodiment of the switching unit thereof.
FIG. 7B illustrates the fluid processing apparatus shown in FIG. 7A in another switching state.

FIG. 7A corresponds in function to FIG. 5A illustrating the second switching state B of the switching unit 240 in the sense of a so-called "feed injection" as described also in the afore-mentioned US2017343520A1, allowing to combine a flow from the sampling unit 210 with a flow from the first fluid pump 20 towards the first chromatographic column 30. As apparent from the valve schematics in FIG. 7A, a fluidic path is provided from the modulation drive 230 to the central port 6 via the modulation buffering unit 220. Radial groove 710 is coupling between central port 6 and peripheral port 1. By providing a movement (into the left direction indicated by the arrow in FIG. 5A), the modulation drive 230 can pressurize the fluid content within the modulation buffering unit 220 while the port 6 is disconnected from any peripheral port.

At the second coupling point (port 1) the pressure will be approximately the output pressure of the first pump 20, which in an HPLC application may be in the range of 500-1500 bar. When the pressure provided by the modulation drive 230 reaches or exceeds the pressure at the second coupling point (port 1), the flow from the first pump 20 and the flow provided by the modulation drive 230 will combine into a flow towards the first column 30, thus allowing to inject the fluid content buffered in the modulation drive 230, or at least a part thereof, into the first mobile phase (provided by the first pump 20) towards the first column 30. Once connected to the first flow path 205, the modulation drive 230 can provide a flow of the fluid content buffered in the sampling unit 210, or at least a part thereof, such that it will combine into the first mobile phase provided by the first pump 20 towards the first column 30. Such injected fluid content, which may be a sample fluid, can then be chromatographically separated by the first column 30. At the same time, the second pump 20' is coupled (via port 3 or directly) to the second column 30'.

FIG. 7B corresponds in function to FIG. 5C illustrating the first switching state A—in a draw mode—of the switching unit 240 allowing a so-called "1 D-outlet aliquoting" for introducing fluid into the modulation buffering unit 220 from downstream of the first chromatographic column 30. In the schematics of FIG. 7B, the rotor of the switching unit 240 takes position anticlockwise with respect to FIG. 7A, so that radial groove 710 now couples between central port 6 and peripheral port 2. Port 2 represents the first coupling point within the first flow path 205 and allows the modulation drive 230 to draw fluid output from the first column 30 into the modulation buffering unit 220. At the same time, the second pump 20' is coupled (via port 3 or directly) to the second column 30'.

Figures 7C, 7D:
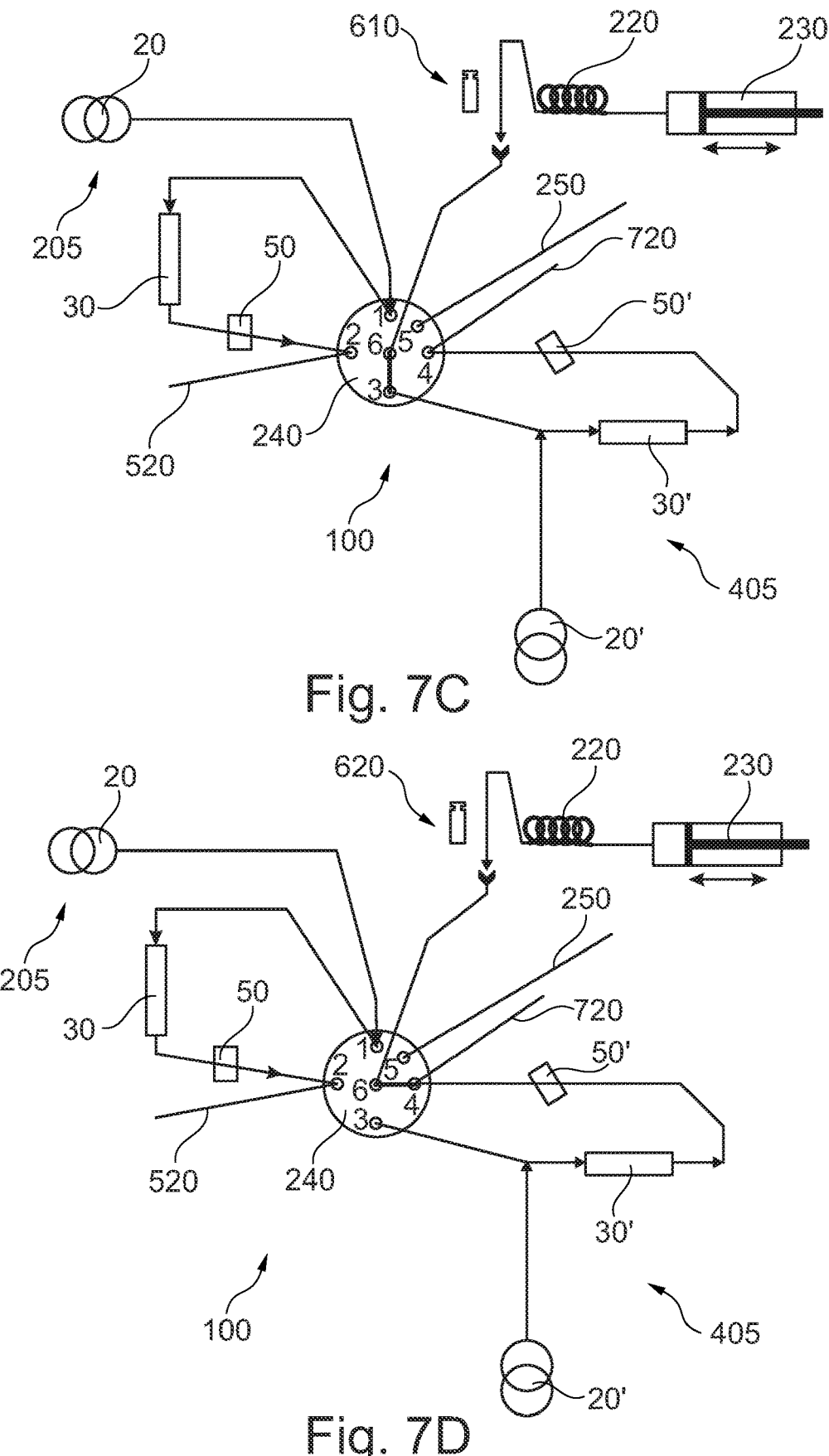
FIG. 7C illustrates the fluid processing apparatus shown in FIG. 7A in another switching state.
FIG. 7D illustrates the fluid processing apparatus shown in FIG. 7A in another switching state.

FIG. 7C corresponds in function to FIG. 5E illustrating the fourth switching state E, so called "2D-injection", in the "feed injection" mode for introducing fluid buffered in the modulation buffering unit 220 in or into the second flow path 405 between the second fluid pump 20' and the second chromatographic column 30'. In the schematics of FIG. 7C, the rotor of the switching unit 240 takes position anticlockwise with respect to FIG. 7B, so that radial groove 710 now couples between central port 6 and peripheral port 3. Accordingly, port 3 represents the third coupling point in the second flow path 405 between the second fluid pump 20' and the second chromatographic column 30' allowing the sampling unit 210 to introduce a fluid content buffered in the modulation buffering unit 220 into the third coupling point of port 3—in the sense of the so-called "feed injection"—by combining a flow from the second fluid pump 20' with a flow from the modulation buffering unit 220 as provided by operation of the modulation drive 230. At the same time, the first pump 20 is coupled (via port 1) to the first column 30, which in turn is coupled via port 2 to conduit 520 and thus may be to waste.

FIG. 7D illustrates the fifth switching state F, so called "2D-outlet aliquoting", for introducing fluid into the modulation buffering unit 220 from downstream of the second chromatographic column 30' in a "draw mode". In the schematics of FIG. 7D, the rotor of the switching unit 240 takes position anticlockwise with respect to FIG. 7C, so that radial groove 710 now couples between central port 6 and peripheral port 4. This allows the modulation drive 230 to draw fluid from the outlet of the second chromatographic column 30' into the modulation buffering unit 220. At the same time, the first pump 20 is coupled (via port 1) to the first column 30, which in turn is coupled via port 2 to conduit 520 and thus may be to waste.

Figures 7E, 7F:
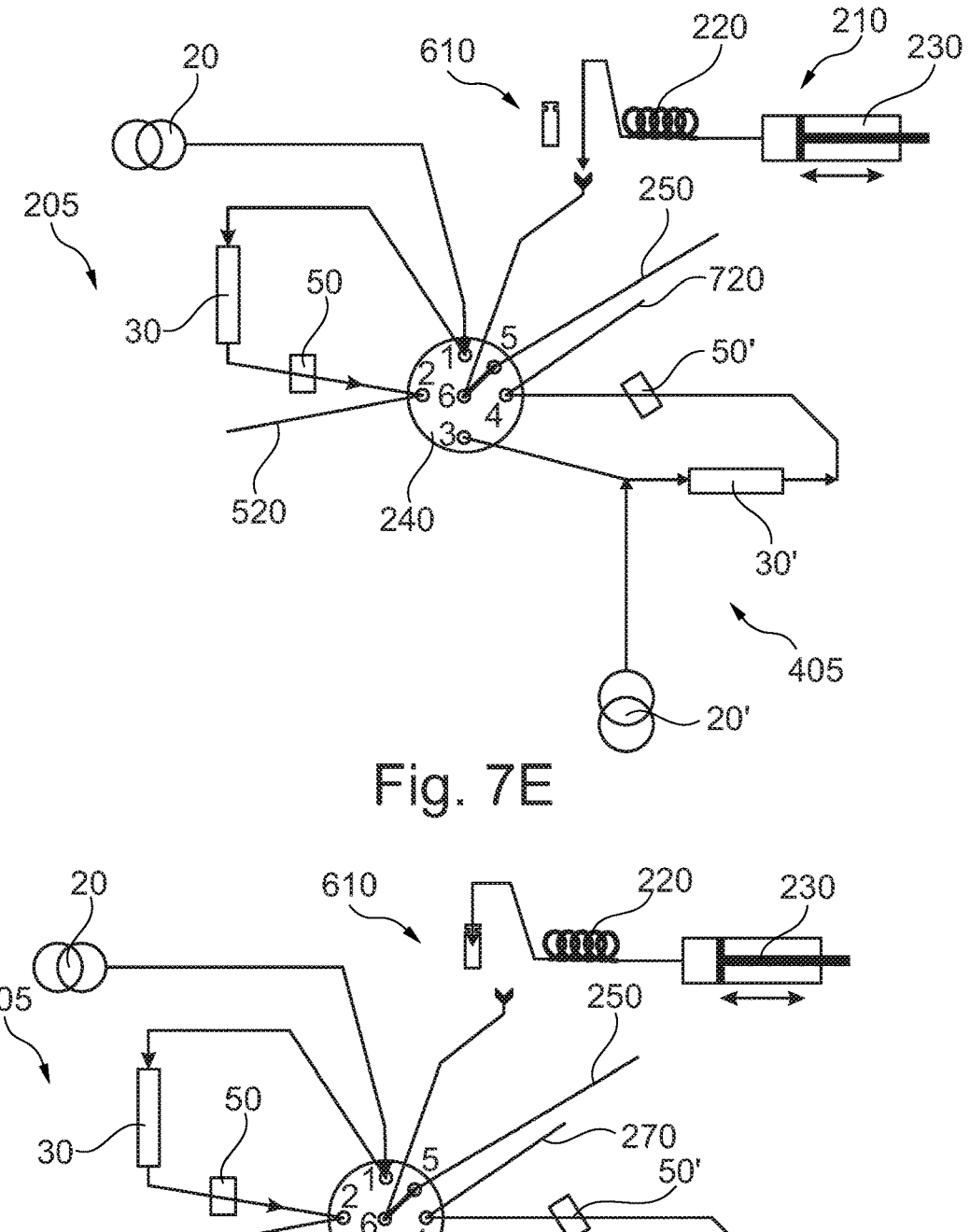
FIG. 7E illustrates the fluid processing apparatus shown in FIG. 7A in another switching state.
FIG. 7F illustrates the fluid processing apparatus shown in FIG. 7A in another switching state.

FIG. 7E illustrates the external switching state D of the switching unit 240 allowing to introduce fluid from the external fluid unit 250 into the modulation buffering unit 220. In the schematics of FIG. 7E, the rotor of the switching unit 240 takes position anticlockwise with respect to FIG. 7D, so that radial groove 710 now couples between central port 6 and peripheral port 5. This allows the modulation drive 230 to draw into the modulation buffering unit 220 fluid from the external fluid unit 250, e.g. a vessel or other container or an online sampling supply which may for example be coupled to a chemical and/or biological reactor for continuously monitoring samples thereof. At the same time, the first pump 20 is coupled (via port 1) to the first column 30, which in turn is coupled via port 2 to conduit 520 and thus may be to waste, and the second pump 20' is coupled (via port 3 or directly) to the second column 30'.

FIG. 7F shows the same external switching state D as in FIG. 7E, however with the needle-seat configuration 610 being in an open position, wherein the needle is physically separated from the seat in order to aspirate an external fluid (such as a sample fluid) e.g. from a vial (as schematically indicated in FIG. 7F.

Figure 8:
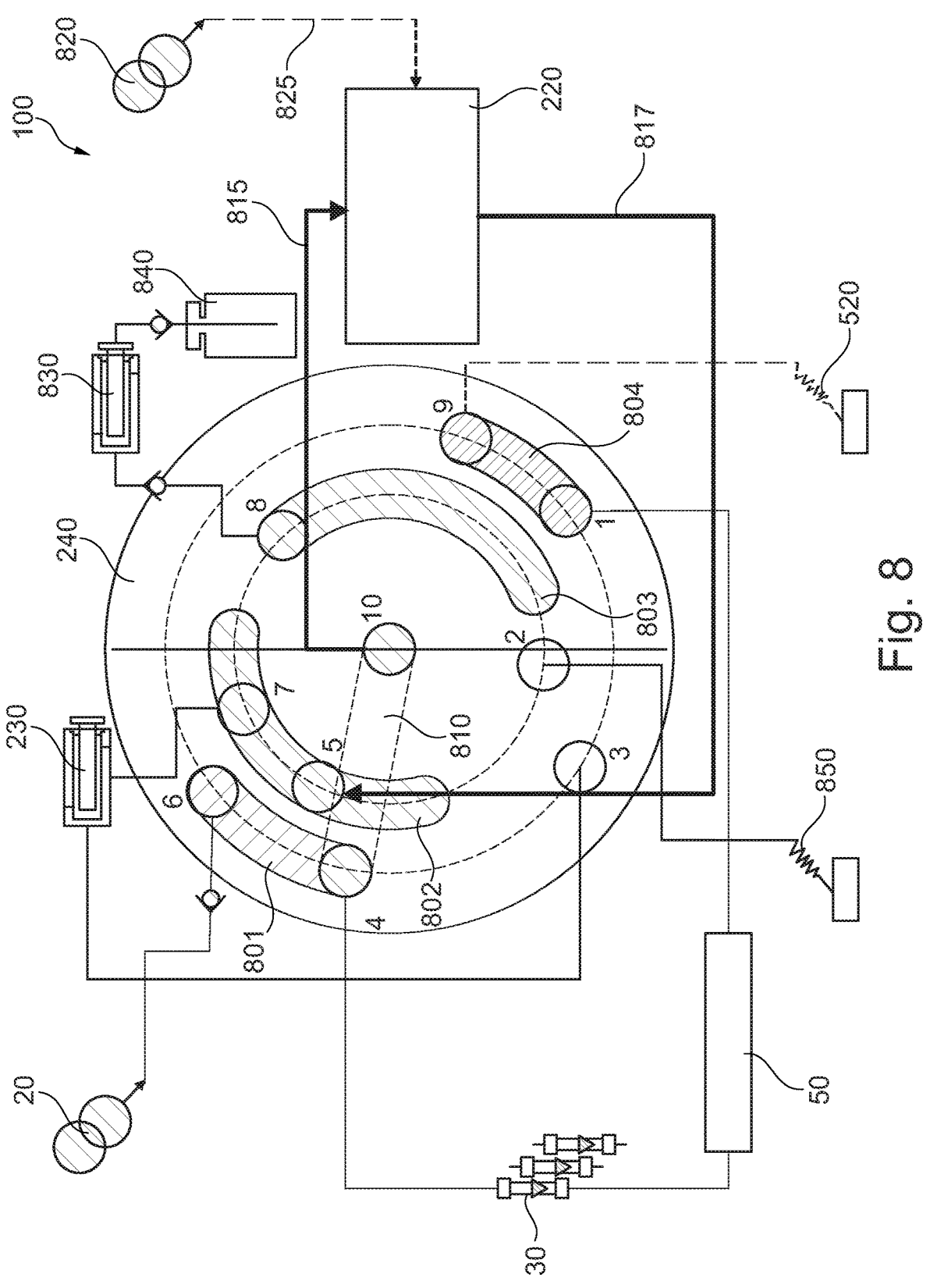
FIG. 8 illustrates in greater detail another embodiment of a fluid processing apparatus.

FIG. 8 illustrates in greater detail another embodiment of the fluid processing apparatus 100. The switching unit 240 is also embodied as a rotational valve and having ten ports 1-10, two circular rotor grooves 802/803, and one (e.g. longitudinal) rotor groove 810 (indicated by dotted lines). Circular rotor grooves 802 and 803 provide circular segments in an inner circle around central port 10, with ports 2, 5, 7, and 8 also lying in that inner circle and which may be fluidically coupled by the respective circular rotor grooves 802 and 803. Circular stator grooves 801 and 804 provide circular segments in an outer circle around the inner circle and central port 10, with ports 1, 4, 6, and 9 also lying in that outer circle and which may be fluidically coupled by the respective circular stator grooves 801 and 804. The rotor groove 810 is coupling on one end to the central port 10, and the other end of the rotor groove 810 may be coupled to any one of the ports 1, 4, 6, and 9.

The first pump 20 is coupled to port 6. One end of the first column 30 is coupling to port 4, the other end of the first column 30 is coupling to one end of the first detector 50, and the other end of the first detector 50 is coupling to port 1. The first column 30 may also be embodied as an array of columns (as indicated in FIG. 8) allowing to individually select/address one or more columns. One end of the modulation drive 230 is coupled to port 7 while the other end is coupled to port 3. The modulation buffering unit 220 couples with one end via a conduit 815 to the central port 10, while the other end thereof is coupled via a conduit 817 to port 5. An optional additional pump 820 may further be coupled via a conduit 825 to the modulation buffering unit 220 as will be further illustrated with respect to FIG. 9. A flush pump 830 may be provided for flushing the switching valve 240 and is coupling with one end to a solvent source 840 and with the other end to port 8. An additional conduit 850 is coupled on one end to port 2, while the other end may be coupled to waste or any other external unit.

FIG. 8 corresponds in function with FIG. 5A illustrating the second switching state B of the switching unit 240 in the sense of the so-called "feed injection" as described also in the afore-mentioned US2017343520A1, allowing to combine a flow from the sampling unit 210 with a flow from the first fluid pump 20 towards the first chromatographic column 30. In FIG. 8, port 4 represents the second coupling point for providing the feed injection. As apparent from the valve schematics in FIG. 8, port 3 is blocked, while a fluidic path is provided from the modulation drive 230 via ports 7 and 5 (coupled together by circular groove 802) to one end of the modulation buffering unit 220. The other end of the modulation buffering unit 220 is coupled to port 10 which is further coupled via stator grooves 810 to port 4 which represents the second coupling point. When the modulation drive 230 pressurizes the fluid content within the modulation buffering unit 220 at or beyond the pressure at the second coupling point (port 4), the flow from the first pump 20 and the flow provided by the modulation drive 230 will combine into a flow towards the first column 30, thus allowing to inject the fluid content buffered in the modulation drive 230, or at least a part thereof, into the first mobile phase (provided by the first pump 20) towards the first column 30. Such injected fluid content, which may be a sample fluid, can then be chromatographically separated by the first column 30.

Further rotation of the switching valve 240 will lead to different switching states of the switching valve 240, e.g. in accordance with the afore-described embodiments. For example, the sampling unit 210 comprised of the modulation drive 230 and the modulation buffering unit 220 may allow aliquoting sample output from the first chromatographic column 30 at the first coupling point. Such further switching states are readily clear from FIG. 8 to the skilled person and need not be further detail here.

Figure 9:
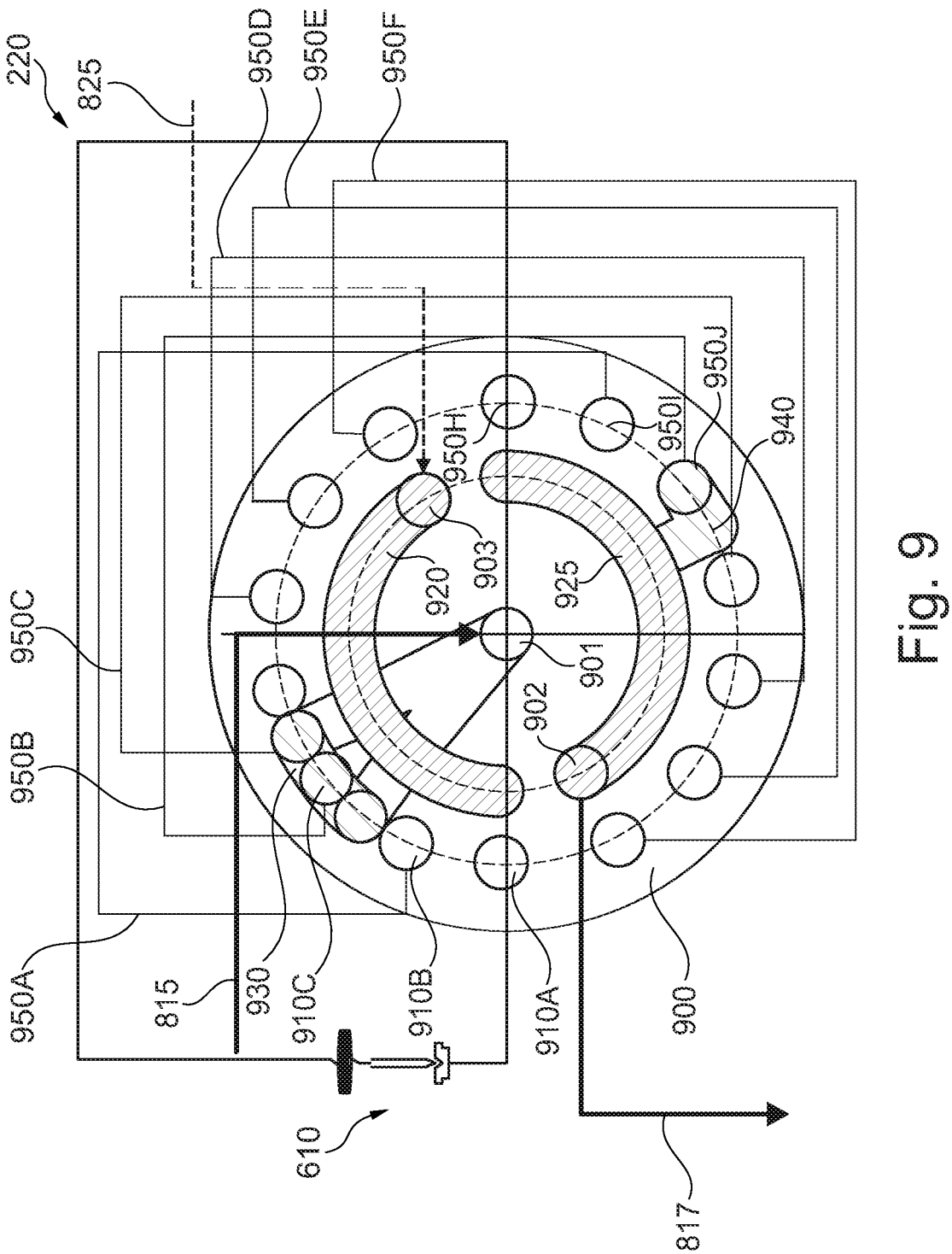
FIG. 9 illustrates an embodiment of a modulation buffering unit.

FIG. 9 illustrates an embodiment of the modulation buffering unit 220 as may e.g. be used in the embodiment of FIG. 8. The modulation buffering unit 220 comprises a valve 900 embodied as a rotational valve with one central port 901, two peripheral ports 902 and 903 laying in an inner circle around the central port 901, and a plurality of further ports 910 laying in an outer circle around the inner circle and the central port 901. In the exemplary embodiment of FIG. 9, fourteen (further) ports 910A, 9106, . . . , are provided in the outer circle. However, the number of further ports 910 is arbitrary and depends on the specific embodiment, namely a number of selectable sample loops 950 as explained later. The valve 900 further comprises two circular grooves 920 and 925 each providing circular segments of the inner circle and being rotatable around central port 901. A further circular groove 930 provides a circular segment of the outer circle and is rotatable around central port 901. A further groove 940 is coupling on one end to the outer circle and the other end thereof is coupling to the circular groove 925.

The embodiment of FIG. 9 shows six sample loops 950A-F, each being coupled between two respective ports 910 of the outer circle. For example, sample loop 950A is coupled between ports 910B and 910I, sample loop 950B is coupled between ports 910C and 910J, et cetera. The needle-seat configuration 610 may be coupled between ports 910A and 910H. Further, conduit 817 is coupled to port 902, conduit 815 is coupled to central port 901, and conduit 825 is coupled to port 903.

As apparent from the schematics of FIG. 9, any one of the sample loops 950 may be individually addressed and coupled between conduits 815 and 817 for either buffering fluid or for injecting buffered fluid, as explained in detail in the afore-described embodiments. This allows for example to buffer fluid one after the other in a respective one of the sample loops 950, and later "emptying" such buffered fluid e.g. for injection to the first chromatographic column 30. The embodiment of FIGS. 8 and 9 may thus provide e.g. a so-called single stack configuration allowing a multidimensional chromatographic separation with a "single" separation unit provided by the first pump 20 and the first column 30.

Figure 10:
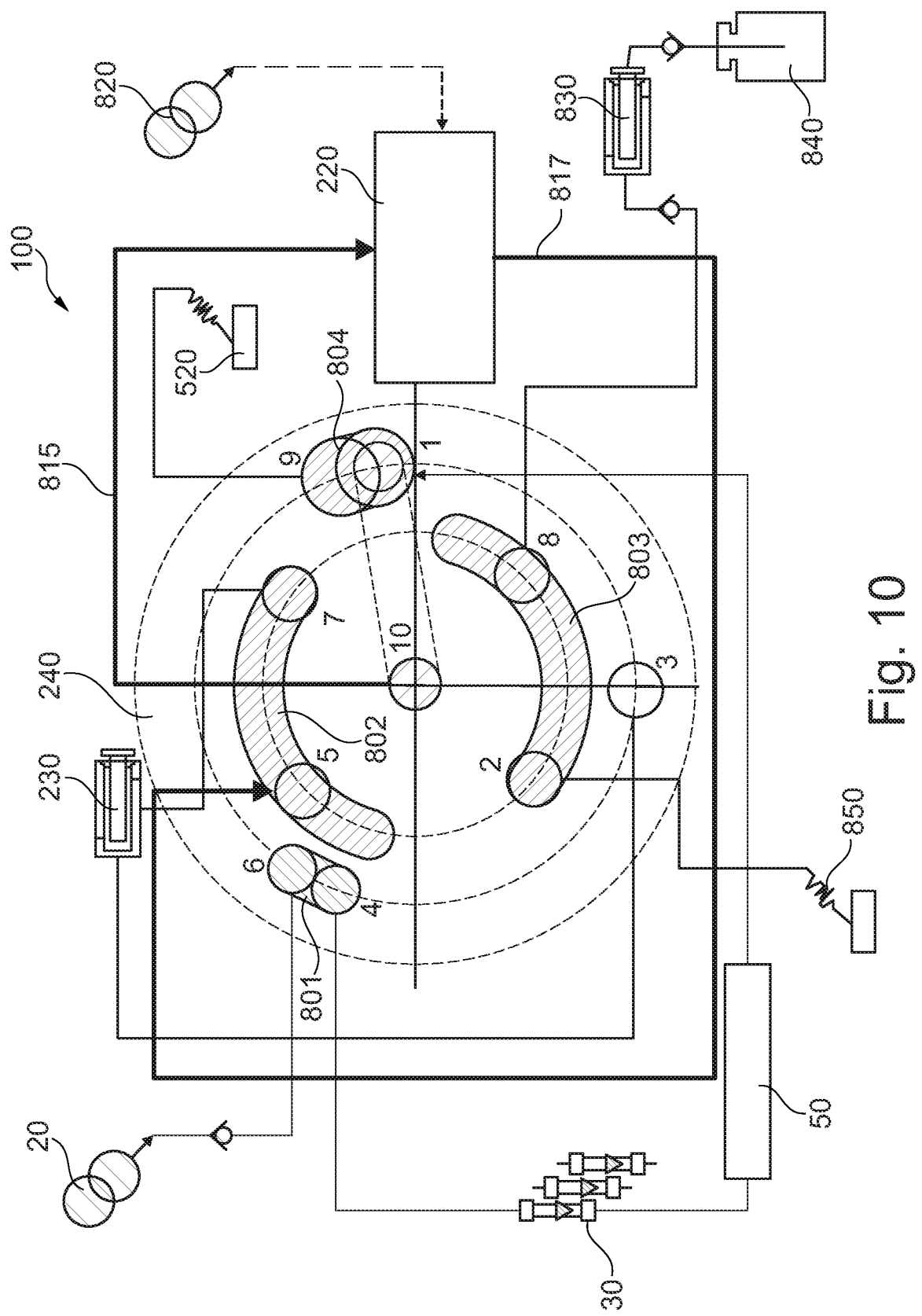
FIG. 10 illustrates in greater detail another embodiment of a fluid processing apparatus.

FIG. 10 illustrates in greater detail another embodiment of the fluid processing apparatus 100 similar to the embodiment of FIG. 8. While the ports 5, 7, and 8 can be coupled with each other by either one of the circular grooves 802 and 803 in the embodiment of FIG. 8, such coupling is not possible in the embodiment of FIG. 10. Beyond that, the explanation for FIG. 8 applies mutatis mutandis to FIG. 10.

The exemplary embodiments of FIGS. 8 and 10 further show additional optional check valves (not indicated by respective reference numerals) which may be used to ensure a desired flow direction, as well known in the art.

It is to be understood that—in all embodiments—the modulation buffering unit 220 may comprise a plurality of buffering units, e.g. a plurality of sample loops as shown in FIG. 9, which may be selectively switchable to or into the fluidic path as e.g. disclosed in WO2016016740A1 by the same applicant.

The modulation drive 230 in the shown Figures is, for the sake of simplicity and explanation, embodied as a syringe-type pumping unit, i.e. a syringe allowing in one mode of operation to withdraw fluid (e.g. from the respective coupling points) and in another mode of operation ("injection") to inject fluid into the respective coupling points. Preferably, such syringe-type pump is implemented with a low dead volume (and preferably zero dead volume). Several other embodiments are possible for implementing such modes of operation of the modulation drive 230, such as a simple modulation syringe or any other type of pumping apparatus, such as reciprocating pumps or pumping units, e.g. comprising one or more one-stage, two-stage, or plural-stage step-piston pumps.

Further it is understood, that the depicted valves 240 and 900 show only schematically the function of switching and may carry further functions, e.g. for flushing etc. It is also understood that the valves 240 and 900 can be embodied in different ways, e.g. as a rotary, translatory valve, microfluidic valve, plurality of ball valves, needle valves and more.

It should be noted that the term "comprising" does not exclude other elements or features and the term "a" or "an" does not exclude a plurality. Also, elements described in association with different embodiments may be combined. It should also be noted that reference signs in the claims shall not be construed as limiting the scope of the claims.

The invention claimed is:

1. A fluid processing apparatus, comprising:
   a first fluid separation apparatus comprising a first fluid pump configured to drive a first mobile phase, and a first separation unit configured to separate a fluidic sample when comprised within the first mobile phase;
   a sampling unit comprising a modulation buffering unit and a modulation drive, wherein the modulation drive comprises an active metering unit and is configured to introduce fluid into the modulation buffering unit; and
   a switching unit configured, in a first switching state, to introduce fluid into the modulation buffering unit from downstream of the first separation unit, and, in a second switching state, to introduce fluid buffered in the modulation buffering unit into the mobile phase in a first flow path between the first fluid pump and the first separation unit for separating the introduced fluid by the first separation unit.

2. The fluid processing apparatus according to claim 1, comprising a first coupling point fluidically coupled downstream of the first separation unit, wherein in the first switching state of the switching unit, the sampling unit is configured to introduce fluid from the first coupling point into the modulation buffering unit.

3. The fluid processing apparatus according to claim 2, comprising a second coupling point in the flow path between the first fluid pump and the first separation unit, wherein in the second switching state of the switching unit, the sampling unit is configured to introduce a fluid content buffered in the modulation buffering unit into the flow path between the first fluid pump and the first separation unit by combining a flow from the first fluid pump with a flow from the modulation buffering unit.

4. The fluid processing apparatus according to claim 1, comprising one of:
   the switching unit is configured, in a third switching state, to enable pressurizing or depressurizing a fluid content within the modulation buffering unit by acting of the modulation drive;
   the switching unit is configured, in a third switching state, to enable pressurizing or depressurizing a fluid content within the modulation buffering unit by acting of the modulation drive, in that the switching unit fluidically blocks one end of the modulation buffering unit while the modulation drive is coupled to and acting on an opposite end of the modulation buffering unit.

5. The fluid processing apparatus according to claim 1, comprising:
   a second fluid separation apparatus comprising a second fluid pump configured to drive a second mobile phase, and a second separation unit configured to separate a fluidic sample when comprised within the second mobile phase,
   wherein the switching unit is configured, in a further switching state, to introduce fluid buffered in the modulation buffering unit into a second flow path between the second fluid pump and the second separation unit.

6. The fluid processing apparatus according to claim 5, comprising a coupling point in the second flow path between the second fluid pump and the second separation unit, wherein in the further switching state of the switching unit, the sampling unit is configured to introduce a fluid content buffered in the modulation buffering unit into the second flow path between the second fluid pump and the second separation unit by combining a flow from the second fluid pump with a flow from the modulation buffering unit.

7. The fluid processing apparatus according to claim 5, wherein the switching unit is configured, in an additional switching state, to introduce fluid into the modulation buffering unit from downstream of the second separation unit, and comprising a coupling point fluidically coupled downstream of the second separation unit, wherein in the additional switching state of the switching unit, the sampling unit is configured to introduce fluid from the coupling point into the modulation buffering unit.

8. The fluid processing apparatus according to claim 7, wherein in the additional switching state of the switching unit, the modulation buffering unit is coupled downstream of the second separation unit and configured to receive a fluid content therefrom.

9. The fluid processing apparatus according to claim 5, comprising at least one of:

wherein the first fluid separation apparatus and the second fluid separation apparatus are fluidically decoupled from each other, so that a transfer of fluid from the first fluid separation apparatus to the second fluid separation apparatus can occur only via active modulation by the switching unit and the sampling unit;

wherein the first flow path and the second flow path are fluidically decoupled from each other, so that a transfer of fluid from the first flow path to the second flow path can occur only via active modulation by the modulation unit.

10. The fluid processing apparatus according to claim 5, wherein in the further switching state of the switching unit, the modulation buffering unit is coupled in the second flow path between the second fluid pump and the second separation unit.

11. The fluid processing apparatus according to claim 1, wherein in the first switching state of the switching unit, the modulation buffering unit is coupled downstream of the first separation unit and configured to receive a fluid content therefrom.

12. The fluid processing apparatus according to claim 1, wherein in the second switching state of the switching unit, the modulation buffering unit is coupled in the flow path between the first fluid pump and the first separation unit.

13. The fluid processing apparatus according to claim 1, wherein the modulation drive is configured to pressurize or depressurize a fluid content in the modulation buffering unit.

14. The fluid processing apparatus according to claim 1, wherein the modulation buffering unit comprises at least one selected from the group consisting of: a sample loop; a sample volume; a trap volume; a trap column; a fluid reservoir; a capillary; a tube; and a microfluidic channel structure.

15. The fluid processing apparatus according to claim 1, wherein the fluid introduced into the modulation buffering unit during the first switching state is different from the buffered fluid introduced into the first flow path between the first fluid pump and the first separation unit during the second switching state.

16. The fluid processing apparatus according to claim 1, wherein:

the modulation drive is configured to introduce the fluid into the modulation buffering unit by a movement of the active metering unit that draws the fluid into the modulation buffering unit; and the modulation drive is configured to introduce the fluid buffered in the modulation buffering unit into the mobile phase in the first flow path by another movement of the active metering unit that ejects the fluid buffered in the modulation buffering unit into the mobile phase in the first flow path.

17. The fluid processing apparatus according to claim 1, wherein the active metering unit comprises at least one selected from the group consisting of: a syringe; a syringe pump; a pump; a pumping unit comprising a plurality of pumps; a piston pump; a reciprocating piston pump; a dual pump comprising two piston pumps connected in parallel or serial to each other; a multi-stage step-piston pump comprising a single piston with at least two sections of different diameters; and a modulation pump comprising a connection port/conduit and configured to intake and eject at least a limited amount of the fluid via the same connection port/conduit.

18. A method for processing fluid, the method comprising:

providing a fluid processing apparatus comprising:

a fluid separation apparatus comprising a fluid pump configured to drive a mobile phase, and a separation unit configured to separate a fluidic sample when comprised within the mobile phase;

a sampling unit comprising a modulation buffering unit and a modulation drive, wherein the modulation drive comprises an active metering unit and is configured to introduce fluid into the modulation buffering unit; and a switching unit configured to switch to a first switching state and to a second switching state;

in the first switching state, introducing fluid into the modulation buffering unit from downstream of the separation unit by operating the modulation drive; and in a second switching state of the switching unit, introducing fluid buffered in the modulation buffering unit into the mobile phase in a flow path between the fluid pump and the separation unit for separating the introduced fluid by the separation unit.

19. The method according to claim 18, wherein the fluid introduced into the modulation buffering unit during the first state is different from the buffered fluid introduced into the mobile phase during the second state.

\* \* \* \* \*